United States Patent
Rounthwaite et al.

(10) Patent No.: US 7,219,148 B2
(45) Date of Patent: May 15, 2007

(54) FEEDBACK LOOP FOR SPAM PREVENTION

(75) Inventors: Robert L. Rounthwaite, Fall City, WA (US); Joshua T. Goodman, Redmond, WA (US); David E. Heckerman, Bellevue, WA (US); John D. Mehr, Seattle, WA (US); Nathan D. Howell, Seattle, WA (US); Micah C. Rupersburg, Seattle, WA (US); Dean A. Slawson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 844 days.

(21) Appl. No.: 10/378,463

(22) Filed: Mar. 3, 2003

(65) Prior Publication Data

US 2004/0177110 A1 Sep. 9, 2004

(51) Int. Cl.
*G06F 15/173* (2006.01)
(52) U.S. Cl. .................. 709/224; 709/206; 709/207; 713/154
(58) Field of Classification Search ............. 709/224, 709/206–207, 217, 223; 713/154
See application file for complete search history.

(56) References Cited

U.S. PATENT DOCUMENTS

| | | |
|---|---|---|
| 5,377,354 A | 12/1994 | Scannell et al. |
| 5,619,648 A | 4/1997 | Canale et al. |
| 5,638,487 A | 6/1997 | Chigier |
| 5,704,017 A | 12/1997 | Heckerman et al. |
| 5,805,801 A | 9/1998 | Holloway et al. |
| 5,835,087 A | 11/1998 | Herz et al. |
| 5,884,033 A | 3/1999 | Duvall et al. |
| 5,905,859 A | 5/1999 | Holloway et al. |
| 6,003,027 A | 12/1999 | Prager |

(Continued)

FOREIGN PATENT DOCUMENTS

| | | |
|---|---|---|
| EP | 413 537 | 2/1991 |
| EP | 720 333 | 7/1996 |
| EP | 1376427 | 3/2003 |
| EP | 1376427 A2 | 1/2004 |
| EP | 1376427 A3 | 1/2004 |
| WO | WO96/35994 | 11/1996 |
| WO | WO 02/071286 | 9/2002 |
| WO | WO 2004/059506 | 7/2004 |

OTHER PUBLICATIONS

European Search Report dated Apr. 6, 2006 and mailed Apr. 6, 2006 for EP 04102242, 3 pages.

(Continued)

*Primary Examiner*—Philip B. Tran
(74) *Attorney, Agent, or Firm*—Amin, Turocy & Calvin, LLP

(57) ABSTRACT

The subject invention provides for a feedback loop system and method that facilitate classifying items in connection with spam prevention in server and/or client-based architectures. The invention makes uses of a machine-learning approach as applied to spam filters, and in particular, randomly samples incoming email messages so that examples of both legitimate and junk/spam mail are obtained to generate sets of training data. Users which are identified as spam-fighters are asked to vote on whether a selection of their incoming email messages is individually either legitimate mail or junk mail. A database stores the properties for each mail and voting transaction such as user information, message properties and content summary, and polling results for each message to generate training data for machine learning systems. The machine learning systems facilitate creating improved spam filter(s) that are trained to recognize both legitimate mail and spam mail and to distinguish between them.

81 Claims, 11 Drawing Sheets

U.S. PATENT DOCUMENTS

| | | | |
|---|---|---|---|
| 6,023,723 A | 2/2000 | McCormick et al. | |
| 6,047,242 A | 4/2000 | Benson | |
| 6,052,709 A | 4/2000 | Paul | |
| 6,072,942 A | 6/2000 | Stockwell et al. | |
| 6,101,531 A | 8/2000 | Eggleston et al. | |
| 6,112,227 A | 8/2000 | Heiner | |
| 6,161,130 A | 12/2000 | Horvitz et al. | |
| 6,167,434 A * | 12/2000 | Pang | 709/206 |
| 6,192,360 B1 | 2/2001 | Dumais et al. | |
| 6,199,102 B1 | 3/2001 | Cobb | |
| 6,266,692 B1 | 7/2001 | Greenstein | |
| 6,308,273 B1 | 10/2001 | Goertzel et al. | |
| 6,321,267 B1 * | 11/2001 | Donaldson | 709/229 |
| 6,327,617 B1 | 12/2001 | Fawcett | |
| 6,330,590 B1 | 12/2001 | Cotten | |
| 6,370,526 B1 | 4/2002 | Agrawal et al. | |
| 6,393,465 B2 | 5/2002 | Leeds | |
| 6,421,709 B1 * | 7/2002 | McCormick et al. | 709/206 |
| 6,424,997 B1 | 7/2002 | Buskirk, Jr. et al. | |
| 6,434,600 B2 | 8/2002 | Waite et al. | |
| 6,453,327 B1 | 9/2002 | Nielsen | |
| 6,477,551 B1 | 11/2002 | Johnson et al. | |
| 6,484,197 B1 | 11/2002 | Donohue | |
| 6,484,261 B1 | 11/2002 | Wiegel | |
| 6,505,250 B2 | 1/2003 | Freund et al. | |
| 6,546,416 B1 | 4/2003 | Kirsch | |
| 6,592,627 B1 | 7/2003 | Agrawal et al. | |
| 6,615,242 B1 | 9/2003 | Riemers | |
| 6,633,855 B1 | 10/2003 | Auvenshine | |
| 6,643,686 B1 * | 11/2003 | Hall | 709/206 |
| 6,684,201 B1 | 1/2004 | Brill | |
| 6,691,156 B1 | 2/2004 | Drummond et al. | |
| 6,701,440 B1 * | 3/2004 | Kim et al. | 713/188 |
| 6,728,690 B1 | 4/2004 | Meek et al. | |
| 6,732,149 B1 | 5/2004 | Kephart | |
| 6,732,157 B1 * | 5/2004 | Gordon et al. | 709/206 |
| 6,732,273 B1 | 5/2004 | Byers | |
| 6,757,830 B1 | 6/2004 | Tarbotton et al. | |
| 6,775,704 B1 | 8/2004 | Watson et al. | |
| 6,779,021 B1 | 8/2004 | Bates et al. | |
| 6,915,334 B1 | 7/2005 | Hall | |
| 6,928,465 B2 * | 8/2005 | Earnest | 709/206 |
| 6,971,023 B1 | 11/2005 | Makinson et al. | |
| 2001/0046307 A1 | 11/2001 | Wong | |
| 2002/0016956 A1 | 2/2002 | Fawcett | |
| 2002/0059425 A1 | 5/2002 | Belfiore et al. | |
| 2002/0073157 A1 | 6/2002 | Newman et al. | |
| 2002/0091738 A1 | 7/2002 | Rohrabaugh et al. | |
| 2002/0184315 A1 | 12/2002 | Earnest | |
| 2002/0199095 A1 | 12/2002 | Bandini et al. | |
| 2003/0009638 A1 | 1/2003 | Lindeman et al. | |
| 2003/0009698 A1 | 1/2003 | Lindeman et al. | |
| 2003/0037074 A1 | 2/2003 | Dwork et al. | |
| 2003/0041126 A1 | 2/2003 | Buford et al. | |
| 2003/0088627 A1 | 5/2003 | Rothwell et al. | |
| 2003/0167311 A1 | 9/2003 | Kirsch | |
| 2003/0204569 A1 | 10/2003 | Andrews et al. | |
| 2003/0229672 A1 * | 12/2003 | Kohn | 709/207 |
| 2004/0003283 A1 | 1/2004 | Goodman et al. | |
| 2004/0015554 A1 | 1/2004 | Wilson | |
| 2004/0054887 A1 | 3/2004 | Paulsen et al. | |
| 2004/0093371 A1 | 5/2004 | Burrows et al. | |
| 2004/0139160 A1 | 7/2004 | Wallace et al. | |
| 2004/0139165 A1 | 7/2004 | McMillan et al. | |
| 2004/0177120 A1 | 9/2004 | Kirsch | |
| 2004/0199594 A1 | 10/2004 | Radatti et al. | |
| 2005/0015455 A1 * | 1/2005 | Liu | 709/207 |
| 2006/0036701 A1 | 2/2006 | Bulfer et al. | |

OTHER PUBLICATIONS

Graham. "The Future of SPAM" (2003) Computer Journal, CSI Computer Security Institute, vol. 19, No. 1, 6 pages.

International Search Report dated Jan. 17, 2006, mailed Jan. 31, 2006, for PCT Application Serial No. PCT/US04/05501, 2 Pages.

Written Opinion of the Internatioanl Preliminary Examining Authority mailed Nov. 30, 2005 for PCT/US03/41526, 5 pages.

U.S. Appl. No. 10/208,150, filed Jul. 29, 2002, Andaker.

U.S. Appl. No. 09/893,941, filed Jun. 28, 2001, Horvitz.

U.S. Appl. No. 10/278,591, filed Oct. 23, 2002, Heckermen.

U.S. Appl. No. 10/180,565, filed Jun. 26, 2002, Goodman.

U.S. Appl. No. 09/497,992, filed Feb. 4, 2000, Maller.

U.S. Appl. No. 10/291,260, filed Nov. 8, 2002, Burrows.

Breiman, Friedman, Olshen, and Stone. "Classification and Regression Trees." Wadsworth & Brooks, Monterey, CA (1984).

Quinlan. "c4.5: Programs for Machine Learning." Morgan Kaufmann, San Francisco, CA (1993).

Hayes, Brian."Spam, Spam, Spam, Lovely Spam." American Scientist Online, Jun. 30, 2003. pp. 1-6, vol. 91.

Partial European Search Report, EP05100847, mailed Jun. 21, 2005, 5 pages.

European Search Report, dated Jun. 9, 2005, mailed Aug. 22, 2005 for European Patent Application Serial No. EP04011978, 12 pages.

Yu Wu, et al., A New Anti-Spam Filter Based on Data Mining and Analysis of Email Security, Conference Proceedings of the SPIE, Data Mining and Knowledge Discovery Theory, Tools and Technology V, vol. 5098, Apr. 21, 2003, pp. 147-154, Orlando, FL, USA.

Massey, B., et al., Learning Spam: Simple Techniques for Freely-Available Software, Proceedings of Freenix Track 2003 Usenix Annual Technical Conference, Online!, Jun. 9, 2003, pp. 63-76, Berkley, CA, USA.

Graham, P., The Future of Spam, Computer Security Journal, CSI Computer Security Institute, vol. 19, No. 1, Jan. 2003, pp. 1-5.

Graham, P., A Plan for Spam, Online!, Aug. 2002, XP002273602, http://www.paulgraham.com/spam.html, retrieved on Mar. 12, 2004.

European Search Report, EP31087TE900, mailed Nov. 11, 2004.

J. Byrne, My Spamblock, Google, Jan. 19, 1997, 2 pages.

D. F. Skoll, How to Make Sure a Human is Sending You Mail, Google, Nov. 17, 1996, 2 pages.

L. M. Bowman, Hotmail Spam Filters Block Outgoing E-Mail, CNET news.com, Jan. 18, 2001, 3 pages.

Thorsten Joachims, Transductive Inference for Text Classification Using Support Vector Machines, In Proceedings of the 16th International Conference on Machine Learning, 1999, pp. 200-209, San Francisco, USA.

Kevin R. Gee, Using Latent Semantic Indexing to Filter Spam, Dept. of Computer Science and Engineering, University of Texas-Arlington, 5 pages, 2003.

Fabrizio Sebastiani, Machine Learning in Automated Text Categorization. ACM Computing Surveys, vol. 34 Issue 1, pp. 1-47, 2002.

I. Androutsopoulos, et al. Learning to Filter Spam E-mail: A Comparison of a Naive Bayesian and a Memory-based Approach. 4th PKDD's Workshop on Machine Learning and Textual Information Access, 2000. 13 pages.

I. Androutsopoulos,et al., An Experimental Comparison of Naive Bayesian and Keyword-based Anti-spam Filtering with Personal E-mail Messages. Proceedings of the 23rd ACM SIGIR Conference, pp. 160-167, 2000.

P. Pantel, et al., SpamCop: A Spam Classification & Organization Program. In Proc. AAAI-1998 Workshop on Learning for Text Categorization, 1998. 8 pages.

G. Manco, et al., Towards an Adaptive Mail Classifier. In Proc. of Italian Association for Artificial Intelligence Workshop, 2002. 12 pages.

Cormac O'Brien, et al., Spam Filters: Bayes vs. Chi-squared; Letters vs. Words, Proceedings of the 1st International symposium on Information and communication technologies, 2003, pp. 291-296, Dublin, Ireland.

Olle Balter, et al., Bifrost Inbox Organizer: Giving users control over the inbox, NordiCHI Oct. 2, 2002, pp. 111-118, Århus, Denmark.

Lorrie Faith Cranor, et al., Spam!, Communications of the ACM, 1998, pp. 74-83, vol. 41-No. 8.

John Wong, Preventing Spams and Relays, Linux Journal, Dec. 1998, 6 pages, vol. 1998 Issue 56es, Specialized Systems Consultants, Inc.

Meng Weng Wong, SPF Overview, Linux Journal, Apr. 2004, 6 pages, vol. 2004 Issue 120, Specialized Systems Consultants, Inc.

Stop, in the Name of Spam, Communications of the ACM, Nov. 1998, pp. 11-14, vol. 41 No. 11, ACM.

Eric Allman, Spam, Spam, Spam, Spam, Spam, the FTC, and Spam, Queue, Sep. 2003, pp. 62-69, vol. 1 Issue 6, ACM.

Tom Fawcett, "In vivo" Spam Filtering: A Challenge Problem for KDD, SIGKDD Explorations, Dec. 2003, pp. 140-148, vol. 5 Issue 2, ACM.

J.D.M. Rennie, ifile: An Application of Machine Learning to E-Mail Filtering. Proceedings of the KDD-2000 Workshop on Text Mining, Sixth ACM SIGKDD International Conference on Knowledge Discovery and Data Mining, 2000. 6 pages.

S. Argamon, et al., Routing documents according to style. In First International Workshop on Innovative Information Systems, 1998. 8 pages.

K. Mock, An Experimental Framework for Email Categorization and Management. Proceedings of the 24th Annual International ACM SIGIR Conference, pp. 392-393, 2001.

Jose Maria Gomez Hidalgo, Evaluating Cost-Sensitive Unsolicited Bulk Email Categorization, SAC 2002, 2002, pp. 615-620, ACM, Madrid, Spain.

A.Z. Broder, et al. Syntactic Clustering of the Web. SRC Technical Note, Digital Corporation, Jul. 25, 1997. 13 pages.

P.Y. Simard, et al., Using Character Recognition and Segmentation to Tell Computer from Humans. International Conference on Document Analysis and Recogntion (ICDAR), IEEE Computer Society, Los Alamitos, pp. 418-423, 2003.

S. Li et al., Secure Human-Computer Identification against Peeping: A Survey. Technical Report, Microsoft Research, 2003. 53 pages.

D.A. Turner et al., Controlling Spam through Lighweight Currency. In Proc. of the Hawaii International Conference on Computer Sciences, Jan. 2004. 9 pages.

D. Turner et al., Payment-based Email. 5th International Conference on Software Engineering, Artificial Intelligence, Networking, and Parallel/Distributed Computing, Jun. 2004. 7 pages.

Cynthia Dwork, et al.; "Pricing Via Processing or Combatting Junk Mail"; Presented at Crypto '92; pp. 1-11.

Thorsten Joachims; "Text Categorization with Support Vector Machines: Learning with Many Relevant Features"; LS-8 Report 23, Nov. 1997, 18 pages.

Daphne Koller, et al.; "Hierarchically Classifying Doucments Using Very Few Words"; In ICML-97: Proceedings of the Fourteenth International Conference on Machine Learning; San Francisco, CA: Morgan Kaufmann 1997; 9 pages.

Ellen Spertus; "Smokey: Automatic Recognition of Hostile Messages"; Proceedings of the Conference on Innovative Applications in Artificial Intelligence (IAAI), 1997, 8 pages.

Hinrich Schutze, et al.; "A Comparison of Classifiers and Document Representations for the Routing Problem"; Proceedings of the 18th Annual International ACM SIGIR Conference on Research and Development in Information Retrieval, Seattle, WA, Jul. 9-13, 1995; pp. 229-237.

Yiming Yang, et al.; "A Comparative Study on Feature Selection in Text Categorization"; School of Computer Science, Carngie Mellon University, Pittsburgh, PA, and Verity, Inc., Sunnyvale, CA; 9 pages.

Yiming Yang, et al.; "An Example-Based Mapping Method for Text Categorization and Retrieval"; ACM Transactions on Information Systems, vol. 12, No. 3, Jul. 1994, pp. 252-277.

David D. Lewis, et al.; "A Comparison of Two Learning Algorithms for Text Categorization"; Third Annual Symposium on Document Analysis and Information Retrieval; Apr. 11-13, 1994; pp. 81-93.

Mehran Sahami; "Learning Limited Dependence Bayesian Classifiers"; In KDD-96: Proceedings of the Second International Conference on Knowledge Discovery and Data Mining; AAAI Press, 1996; Menlo Park, CA; pp. 335-338.

William W. Cohen; "Learning Rules that Classify E-Mail"; In the Proceedings of the 1996 AAAI Spring Symposium on Machine Learning in Information Access. Downloaded from William Cohen's web page: http://www.research.att.com/nwcohen/pubs.html.

Makoto Iwayama, et al.; "Hierarchical Bayesian Clustering for Automatic Text Classifiation"; Natural Language; 1995; pp. 1322-1327.

David D. Lewis; "An Evaluation of Phrasal and Clustered Representations on a Text Categorization Task"; 15th Annual International SIGIR '92; Denmark 1992; pp. 37-50.

Daphne Koller, et al.; "Toward Optimal Feature Selection"; Machine Learning; Proc. of the Thirteenth International Conference, Morgan Kaufmann, 1996, 9 pages.

David Dolan Lewis; "Representation and Learning in Information Retrieval"; University of Massachusetts, 1992.

Tom Mitchell; "Machine Learning"; Carnegie Mellon University, Bayesian Learning, Chapter 6, pp. 180-184.

Y. H. Li, et al.; "Classification of Text Documents"; Department of Computer Science and Engineering, Michigan State University, E. Lansing, Michigan, The Computer Journal, vol. 41, No. 8, 1998; 537-546.

Juha Takkinen, et al.; "CAFE: A Conceptual Model for Managing Information in Electronic Mail"; Laboratory for Intelligent Information Systems, Department of Computer and Information Science, Linkoping University, Sweden, Conference on System Sciences, 1998 IEEE.

Jacob Palme, et al.; "Issues When Designing Filters In Messaging Systems"; Department of Computer and Systems Sciences, Stockholm University, Royal Institute of Technology, Skeppargarten 73, S-115 30, Stockholm, Sweden, Computer Communications; 1996; pp. 95-101.

Richard B. Segal, et al., "SwiftFile: An Intelligent Assistant for Organizing E-Mail"; IBM Thomas J. Watson Research Center.

Mehran Sahami, et al., "A Bayesian Approach to Filtering Junk E-Mail"; Stanford University.

David Madigan, "Statistics and The War on Spam," Rutgers University, pp. 1-13, 2003.

Padraig Cunningham, et al., "A Case-Based Approach to Spam Filtering that Can Track Concept Drift," Trinity College, Dublin,Department of Computer Science, May 13, 2003.

Mark Rosen, "E-mail Classification in the Haystack Framework," Massachusetts Institute of Technology, Feb. 2003.

* cited by examiner

FEEDBACK LOOP FOR SPAM PREVENTION

TECHNICAL FIELD

This invention is related to systems and methods for identifying both legitimate (e.g., good mail) and undesired information (e.g., junk mail), and more particularly to classifying electronic mail correspondence for spam prevention.

BACKGROUND OF THE INVENTION

The advent of global communications networks such as the Internet has presented commercial opportunities for reaching vast numbers of potential customers. Electronic messaging, and particularly electronic mail ("email"), is becoming increasingly pervasive as a means for disseminating unwanted advertisements and promotions (also denoted as "spam") to network users.

The Radicati Group, Inc., a consulting and market research firm, estimates that as of August 2002, two billion junk e-mail messages are sent each day—this number is expected to triple every two years. Individuals and entities (e.g., businesses, government agencies) are becoming increasingly inconvenienced and oftentimes offended by junk messages. As such, junk e-mail is now or soon will become a major threat to trustworthy computing.

A key technique utilized to thwart junk e-mail is employment of filtering systems/methodologies. One proven filtering technique is based upon a machine learning approach—machine learning filters assign to an incoming message a probability that the message is junk. In this approach, features typically are extracted from two classes of example messages (e.g., junk and non-junk messages), and a learning filter is applied to discriminate probabilistically between the two classes. Since many message features are related to content (e.g., words and phrases in the subject and/or body of the message), such types of filters are commonly referred to as "content-based filters".

Some junk/spam filters are adaptive, which is important in that multilingual users and users who speak rare languages need a filter that can adapt to their specific needs. Furthermore, not all users agree on what is and is not, junk/spam. Accordingly, by employing a filter that can be trained implicitly (e.g., via observing user behavior) the respective filter can be tailored dynamically to meet a user's particular message identification needs.

One approach for filtering adaptation is to request a user(s) to label messages as junk and non junk. Unfortunately, such manually intensive training techniques are undesirable to many users due to the complexity associated with such training let alone the amount of time required to properly effect such training. In addition, such manual training techniques are often flawed by individual users. For example, subscriptions to free mailing lists are often forgotten about by users and thus, are incorrectly labeled as junk mail. As a result, legitimate mail is blocked indefinitely from the user's mailbox. Another adaptive filter training approach is to employ implicit training cues. For example, if the user(s) replies to or forwards a message, the approach assumes the message to be non-junk. However, using only message cues of this so it introduces statistical biases into the training process, resulting in filters of lower respective accuracy.

Still another approach is to utilize all user(s) e-mail for training, where initial labels are assigned by an existing filter and the user(s) sometimes overrides those assignments with explicit cues (e.g., a "user-correction" method)—for example, selecting options such as "delete as junk" and "not junk"—and/or implicit cues. Although such an approach is better than the techniques discussed prior thereto, it is still deficient as compared to the subject invention described and claimed below.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention provides for a feedback loop system and method that facilitates classifying items in connection with spam prevention. The invention makes uses of a machine-learning approach as applied to spam filters, and in particular, randomly samples incoming email messages so that examples of both legitimate and junk/spam mail are obtained to generate sets of training data. Pre-selected individuals serve as spam fighters and participate in categorizing respective replications (which optionally can be slightly modified) of the samples.

Generally, messages selected for polling are modified in various aspects to appear as polling messages. A unique aspect of the invention is that a copy of an incoming message selected for polling is made such that some users (e.g., spam fighters) will receive the same message (e.g., in terms of message content) twice: once in the form of a polling message and again, in its original form. Another unique aspect of the subject invention is all messages are considered for polling—including those which have been labeled as spam by existing filters. Spam-labeled messages are considered for polling and if selected, are not treated as spam according to specifications of the existing filter (e.g., move to junk folder, delete . . . ).

Unlike conventional spam filters, more accurate spam filters can be created by training spam filters in accordance with the feedback technique of the subject invention so as to learn to distinguish between good mail and spam, thereby mitigating biased and inaccurate filtering. The feedback is accomplished at least in part by polling any suitable number of users to obtain feedback on their incoming email. Users, identified as spam-fighters, are tasked with voting on whether a selection of incoming messages is either legitimate mail or junk mail. Both positive and negative classifications of incoming email are desired to mitigate improperly filtering out as spam mail that is good (e.g., not spam) intended for a user. The respective classifications along with any other information associated with each mail transaction are moved to a database to facilitate training the spam filters. The database and related components can compile and store properties for selected message(s) (or selected mail transaction), which includes user properties, user voting information and histories, message properties such as unique identification numbers assigned to each selected message, message classifications, and message content summaries, or statistical data related to any of the above, to generate sets of training data for machine learning systems. Machine learning systems (e.g., neural networks, Support Vector Machines (SVMs), Bayesian Belief Networks) facilitate creating improved spam filters that are trained to recognize both legitimate mail and spam mail and further, to distinguish between them. Once a new spam filter has been trained in accordance with the invention, it can be distributed to mail servers and client email software programs. Furthermore, the new spam filter can be trained with respect to a specific user(s) to improve performance of a personalized filter(s). As new training data sets are built, the spam filter can undergo further training via machine learning to optimize its performance and accuracy. User feedback by way of message classification can also be utilized to generate lists for spam filters and parental controls, to test spam filter performance, and/or to identify spam origination.

Another aspect of the invention provides for a method of detecting untrustworthy users through cross-validation techniques and/or by known result test messages. Cross-validation involves training a filter from which the polling results of some users are excluded. That is, the filter is trained using polling results from a subset of users. On average, this subset of users will work well enough even with some mistakes to detect those who generally are not in agreement with them. The polling results from the excluded users are compared to those of the trained filter. This comparison essentially determines how the users from the training subset would have voted on the messages belonging to the excluded users. If the agreement between an excluded user's votes and the filter is low, then the polling results from that user can either be discarded or marked for manual inspection. This technique can be repeated as desired, excluding data from different users each time.

Mistakes on individual messages can also be detected such as a message on which the filter and the user vote strongly disagree. These messages can be flagged for either automatic removal and/or manual inspection. As an alternative to cross-validation, a filter can be trained on all or substantially all users. The user votes and/or messages that disagree with the filter can be discarded. Another alternative to cross-validation involves known result test messages in which the user(s) is asked to vote on a message(s) where the result is known. Accurate classification (e.g., user vote matches filter action) of the message by the user verifies the user's trustworthiness and determines whether to remove the user's classifications from training, and whether to remove the user from future polling.

Yet another aspect of the invention provides for creating known spam targets (e.g., honeypots) to identify incoming mail as spam and/or to track specific merchant email address processing. A known spam target, or honeypot, is an email address where the set of legitimate mail can be determined and all other mail can be considered spam. For instance, the email address can be disclosed on a website in a restrictive manner not likely to be found by people. Hence, any mail sent to this address can be considered spam. Alternatively, the email address may have only been disclosed to a merchant from whom legitimate mail is expected to be received. Thus, mail received from the merchant is legitimate mail, but all other mail received can safely be considered spam. Spam data derived from honeypots and/or other sources (e.g., users) can be integrated into the feedback loop system, but because of the substantial increase in spam classification with honeypots, such data should be down weighted, as will be described infra in greater detail, to mitigate obtaining biased polling results.

Another aspect of the invention provides for quarantining messages which are deemed uncertain either by the feedback loop system or by the filter. Such messages are held for any suitable period of time instead of being discarded or classified. This time period can be set in advance, or the message can be held until receipt of a determined number of poll results similar to the message, e.g., from the same IP address or with similar content.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1A:
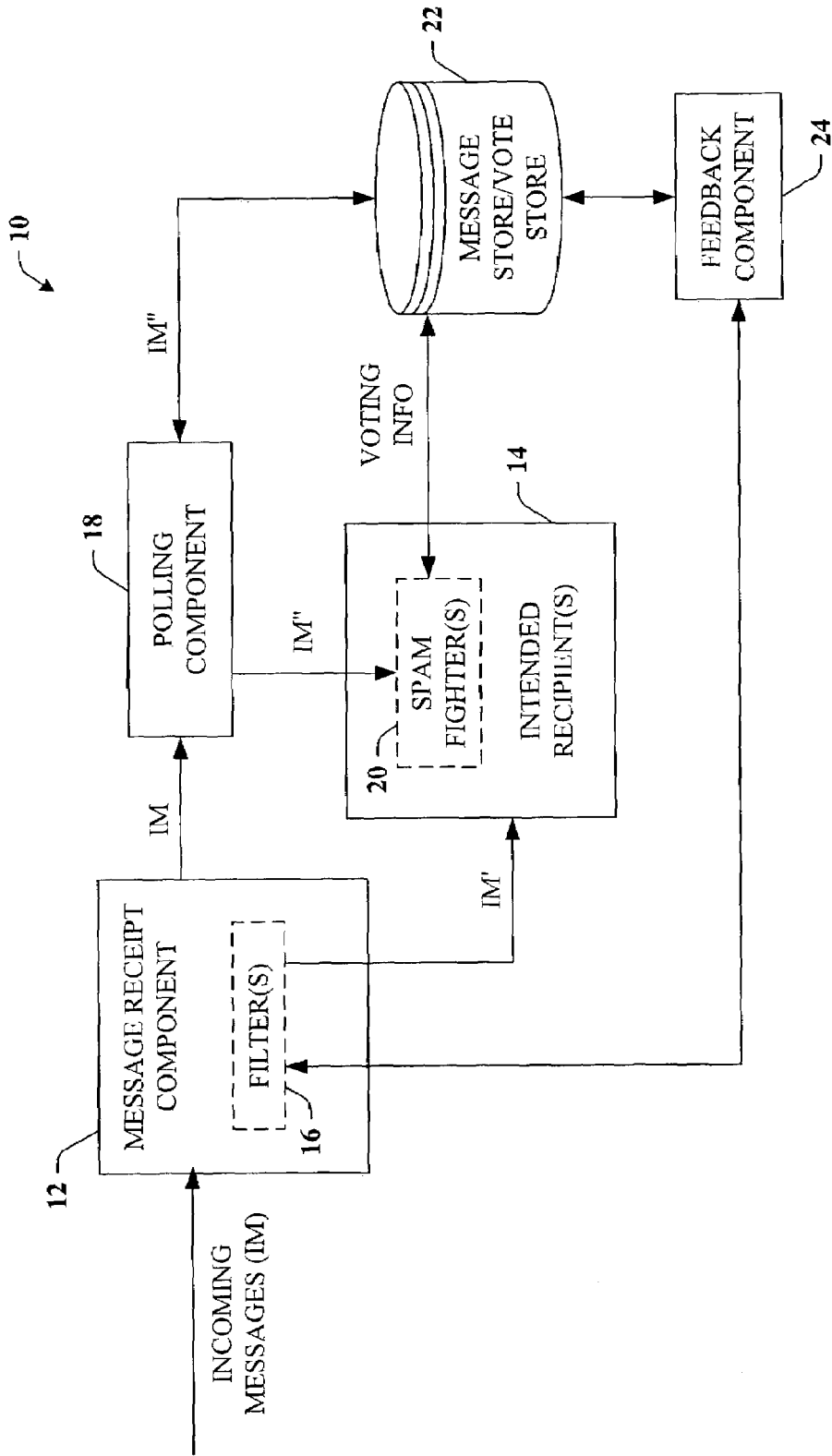
FIG. 1A is a block diagram of a feedback loop training system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The subject invention can incorporate various inference schemes and/or techniques in connection with generating training data for machine learned spam filtering. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

It is to be appreciated that although the term message is employed extensively throughout the specification, such term is not limited to electronic mail per se, but can be suitably adapted to include electronic messaging of any form that can be distributed over any suitable communication architecture. For example, conferencing applications that facilitate a conference between two or more people (e.g., interactive chat programs, and instant messaging programs) can also utilize the filtering benefits disclosed herein, since unwanted text can be electronically interspersed into normal chat messages as users exchange messages and/or inserted as a lead-off message, a closing message, or all of the above. In this particular application, a filter could be trained to automatically filter particular message content (text and images) in order to capture and tag as junk the undesirable content (e.g., commercials, promotions, or advertisements).

In the subject invention, the term "recipient" refers to an addressee of an incoming message or item. The term "user" refers to a recipient who has chosen, either passively or actively, to participate in the feedback loop systems and processes as described herein.

Referring now to FIG. 1A, there is illustrated a general block diagram of a feedback training system 10 in accordance with an aspect of the present invention. A message receipt component 12 receives and delivers incoming messages (denoted as IM) to intended recipients 14. The message receipt component can include at least one filter 16 as is customary with many message receipt components (e.g., junk mail filter) to mitigate delivery of undesirable messages (e.g., spam). The message receipt component 12 in connection with the filter 16 processes the messages (IM) and provides a filtered subset of the messages (IM') to the intended recipients 14.

As part of the feedback aspect of the subject invention, a polling component 18 receives all of the incoming messages (IM) and identities the respective intended recipients 14. The polling component selects a subset of the intended recipients 14 (referred to as spam fighters 20) to classify a subset of the incoming messages (denoted as IM") as spam or not spam, for example. The classification-related information (denoted as VOTING INFO) are submitted to a message store/vote store 22, where the voting information as well as copies of the respective IM" are stored for later use such as by a feedback component 24. In particular, the feedback component 24 employs machine learning techniques (e.g., neural networks, SVMs, Bayesian networks or any machine learning system suitable for employment with the subject invention) which make use of the voting information to train and/or improve the filter 16 (and/or build new filter(s)) with respect to identifying spam mail, for example. As new streams of incoming messages are processed through the newly trained filter 16, less spam and more legitimate messages (denoted as IM') are delivered to the intended recipients 14. Thus, the system 10 facilitates the identification of spam and the training of improved spam filters by utilizing feedback generated by spam fighters 20. Such feedback aspect of the subject invention provides for a rich and highly dynamic scheme for refining a spam detection system. Various details regarding more granular aspects of the subject invention are discussed below.

Figure 1B:
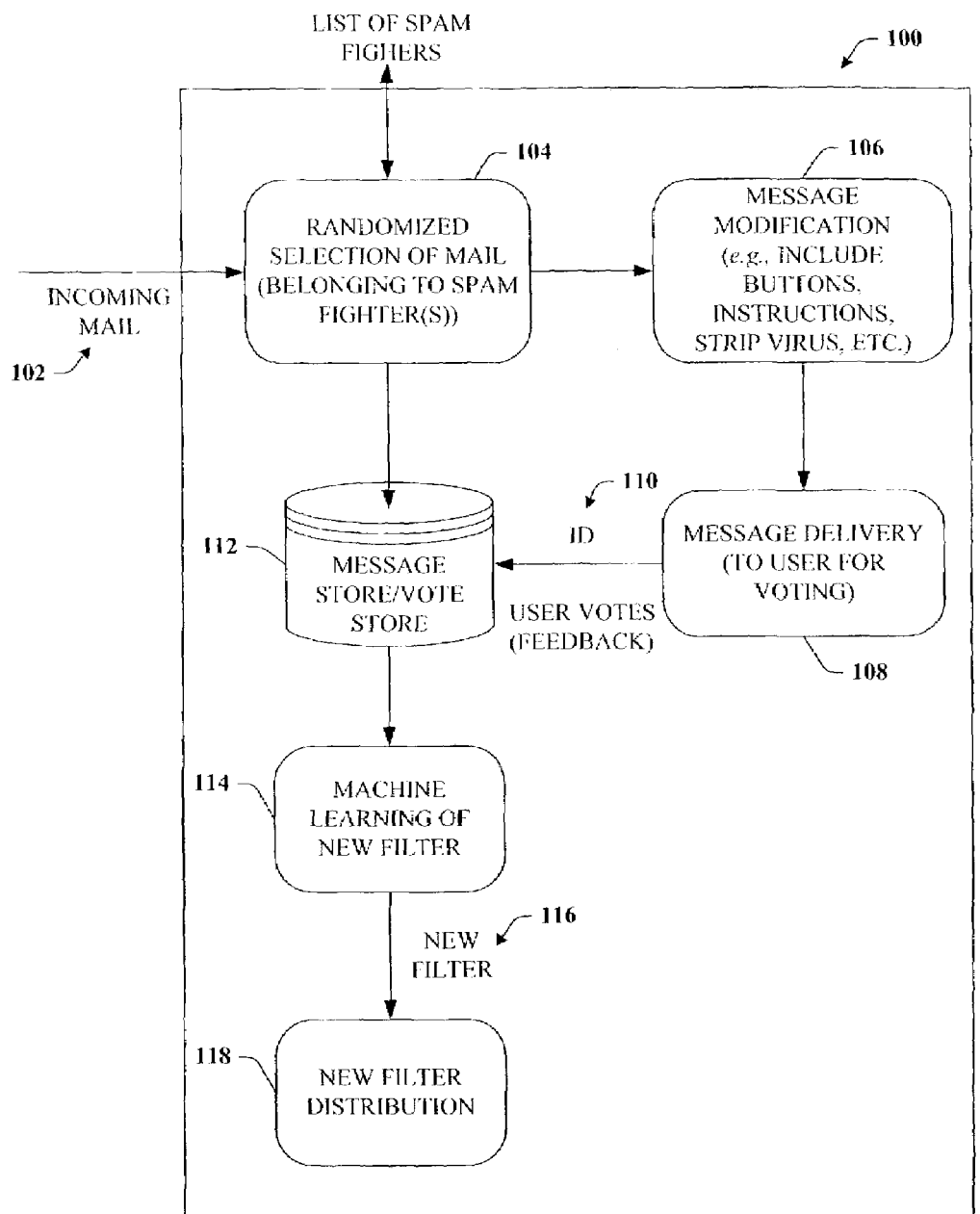
FIG. 1B is a flow diagram of an exemplary feedback loop training process in accordance with an aspect of the present invention.

Referring now to FIG. 1B, there is illustrated a feedback loop training flow diagram 100 in connection with spam fighting and spam prevention in accordance with the subject invention. In preparation of and/or prior to the training process, users are selected to be spam-fighters (e.g., from a master set comprising all email users)—the selection can be based on a random sampling, or level of trust, or any suitable selection scheme/criteria in accordance with the subject invention. For example, the selected subset of users can include all users, a randomly selected set of users, those who have opted in as spam fighters, or those who have not opted out, and/or any combination thereof, and/or based in part upon their demographic location and related information.

Alternatively, the master set of email users selected from can be limited to paying users which can make it more expensive for spammers to subvert the subject invention. Thus, a subset of users selected to participate in the spam fighting could comprise only paying users. A list or customer table including the names and properties of the selected users (e.g., spam fighters) can then be created.

When an incoming stream of messages 102 is received, a recipient of each message is checked against a list of all spam fighters at 104. If the recipient is on the list, then the message is considered for polling. Next, a determination is made whether to select a message for polling. Unlike conventional spam filters, the invention does not delete any messages (e.g., spam) until at least after all incoming mail is considered for polling. That is, the mail is classified before it is subjected to any labeling (e.g., spam, non-spam)—this facilitates obtaining an unbiased sample of messages available for user polling.

A component for message selection (not shown) can be employed to select messages with some random probability to mitigate bias of data. Another approach involves using demographic information as well as other user/recipient attributes and properties. Thus, messages can be selected based at least in part upon the user/recipient. Other alternative algorithms exist for selecting messages. However, there may be limitations on the number of messages selected per user or per user per time period, or on the probability of selecting a message from any given user. Without such limits, a spammer could create an account, send it millions of spam messages, and classify all such messages as good:

this would allow the spammer to corrupt the training database with incorrectly labeled messages.

Some forms of spam filtering, notably referred to as black hole lists may not be skippable. Black hole lists prevent a server from receiving any mail from a list of Internet Protocol (IP) addresses. Therefore, the selection of messages can be chosen from the set of mail which is not from a black hole list.

A unique aspect of the invention is that messages selected for polling, which are marked as spam by filters currently in place, are not deleted or moved to a junk mail folder. Instead, they are placed in a usual inbox or mailbox where all other messages are received for polling consideration. However, if there are two copies of the message, and the message is considered as spam by the filter, then one copy is delivered to the spam folder or otherwise treated according to set parameters (e g., deleted, specially marked, or moved to junk folder).

When a message is selected, it is forwarded to the user and marked in some special way to indicate that it is a polling message. In particular, the selected message can be modified by a message modification component 106. Examples of message modification include, but are not limited to, locating the polling message in a separate folder, changing the 'from' address or the subject line, and/or using a special icon or special color that would identify the message as a polling message to the user. The selected message can also be encapsulated within another message, which would provide instructions to the user on how to vote on and/or classify the encapsulated message. These instructions can include at least two buttons or links: one to vote the message as spam and one to vote the message as not spam, for example.

The voting buttons can be implemented by modifying the contents of the message before sending a copy of the polling message to the user. When the invention is employed with respect to client email software (as opposed to a mail server), the user interface can be modified to include the voting buttons.

Moreover, the polling message can contain instructions and voting buttons as well as the selected message attached thereto. The polling message can also comprise a summary of the selected message such as the subject line, from address, date sent and/or received, and the text or at least the first few lines of the text. Another approach involves sending the message with the voting instructions and voting buttons pre-pended thereto.

In practice, when a user opens and/or downloads a copy of the polling message, buttons (or links) including, but not limited to, "spam" and "not spam" buttons can pop up on the user interface or can be incorporated into the polling message. Thus, it is possible that each polling message contains a set of instructions and suitable voting buttons. Other modifications may be necessary, including possibly removing HTML background instructions (which could obscure the text of instructions or buttons.)

Another button such as a "solicited commercial email" button can also be provided, depending on the type of information that is desired. The message can also include a button/link to opt-out of future polling. The instructions are localized to the user's preferred language and can be embedded into the polling message.

Furthermore, messages selected for polling can be scanned for viruses by the message modification component 106 or by some other suitable virus scanning component (not shown). If a virus is found, the virus can either be stripped away or the message can be discarded. It should be appreciated that virus stripping can occur at any point of the system 100, including when the message is selected and right before the user downloads the message.

Following modification of the message, a message delivery component 108 delivers the polling message to the user for voting. User feedback (e.g., polling message, user's vote, and any user properties associated therewith) is assigned a unique identifier (ID) 110 (e.g., metadata). The ID 110 and/or the information corresponding thereto are submitted to a message store/vote store 112 (e.g., central database), where the user classifications/votes are compiled and stored.

At a database level, selected messages available for polling can be kept for later polling or use. In addition, the database can perform frequency analyses on a timed basis to make sure that a particular user is not being over sampled and that an amount of data is being collected from the user within limits as specified by the user. In particular, the feedback system 100 monitors a percentage limit of a user's mail as well as the sampling period to mitigate bias of both sampling and data. This is especially important where users are selected from all available users, including both low usage and high usage users. For example, a low usage user typically receives and sends a significantly lower volume of mail as compared to a high usage user. Thus, the system 100 monitors the message selection process to be certain that the selected message is approximately one out of every T number of messages received by the user and no more than 1 message received every Z hours by the user. Accordingly, the system can poll 1 out of every 10 incoming messages to be sampled (e.g., considered for polling), but no more than 1 every 2 hours, for example. The frequency, or percentage, limit mitigates sampling a disproportionate amount of messages for a low usage user as compared to a high usage user, and also mitigates overly annoying a user.

On a frequent basis, the central database 112 scans for messages which have been sampled by the system 100 for polling but that have not been classified. The database pulls these messages and localizes them relative to respective user's demographic properties and creates polling messages to request the user(s) to vote and classify the message(s). However, the spam filter may not be modified or trained immediately after receipt of every new incoming classification. Rather, offline training allows a trainer to continually look at the data received into the database 112 on a scheduled, ongoing, or daily basis. That is, the trainer starts from a prescribed starting point or at a set amount of time in the past and looks at all the data from that point forward to train the filter. For example, the prescribed time period can be from midnight to 6:00 AM.

The new spam filter can be trained on an ongoing basis by analyzing the message classifications maintained in the database 112 by way of machine-learning techniques 114 (e.g., neural networks, support vector machines (SVMs)). Machine learning techniques require both examples of good mail and spam to learn from so that they can learn to distinguish between them. Even techniques based on matching known examples of spam can benefit from having examples of good mail, so that they can make sure they do not accidentally catch good mail.

Accordingly, it is important to have both positive and negative examples of spam, instead of just complaints. There are some domains that send out large amounts of both spam and legitimate mail such as free mailing lists. If one built a system based only on complaints, all mail from these domains may be filtered resulting in a large number of mistakes. Hence, knowing that the domain also sends out large amounts of good mail is important. In addition, users often make mistakes such as forgetting that they have signed up on a free mailing list. For instance, a large legitimate provider such as the New York Times regularly sends out legitimate mail. A few users forget that they have signed up and complain, classifying these messages as spam. Without data that most users realize that this mail is legitimate, mail from this site can otherwise be blocked.

The new filter 116 can be distributed on an ongoing basis by a distribution component 118 across participating internet service providers (ISP), to the email or message servers, to individual email clients, to an update server, and/or to the central databases of individual companies. Moreover, the feedback system 100 functions on an ongoing basis such that samples of messages considered and utilized for polling can follow an actual distribution of email received by the system 100. As a result, training data sets employed to train new spam filters are kept current with respect to adaptive spammers. When new filters are built, polling data can be discarded or down weighted (e g, discounted) based on how long ago it was obtained.

The system 100 can be implemented when mail is received at a server such as a gateway server, email server, and/or message server. For instance, when mail comes into an email server, the server looks up the properties of the intended recipients to determine whether the recipients have opted in to the system 100. If their properties indicate as such, the recipients' mail is potentially available for polling. Client-only architectures also exist. For example, client email software can make the polling decisions for a single user and deliver the email either to a central database or use the polling information to improve the performance of a personalized filter. In addition to those described herein, other alternative architectures for this system 100 exist and such are contemplated to fall within the scope of the present invention.

Figure 2:
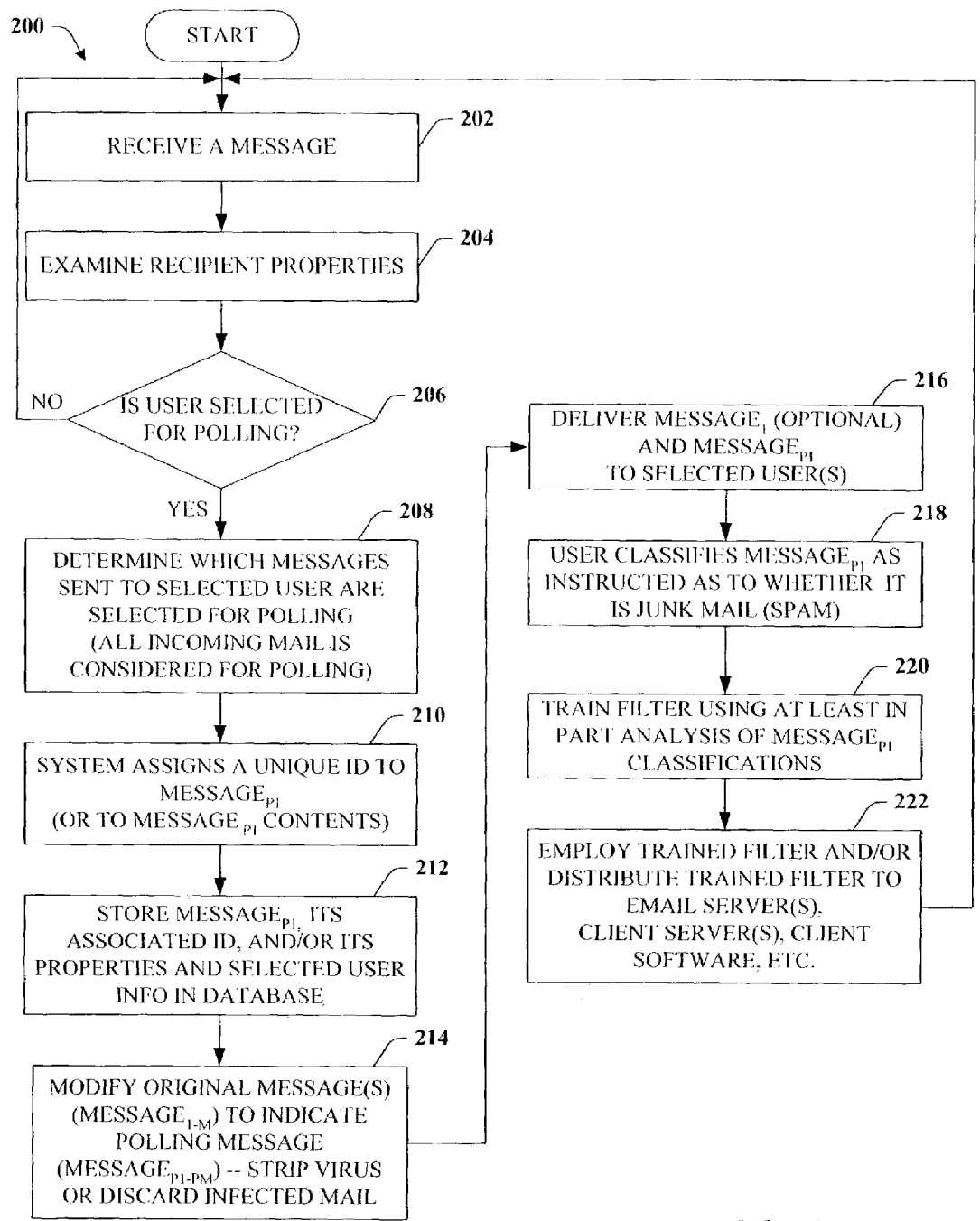
FIG. 2 is a flow diagram of an exemplary method that facilitates mail classification by users to create spam filters in accordance with an aspect of the present invention.

Referring now to FIG. 2, there is illustrated a flow diagram of a basic feedback loop process 200 in accordance with one aspect of the present invention. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

The process 200 begins with mail coming into and being received by a component such as a server at 202. When mail arrives at the server, the server identifies properties of intended recipients to determine whether the intended recipients have previously opted in as spam fighters for polling (at 204). Thus, the process 200 utilizes a user property field where it can be indicated whether the recipient has opted in to the feedback system, or consults a list of users who have opted in. If the user is determined to be a participant in the feedback system and has been selected for polling at 206, the feedback system takes action by determining which messages are selected for polling (at 208). Otherwise, the process 200 returns to 202 until at least one intended recipient of an incoming message is determined to be a user (e.g., spam fighter).

In practice, all messages are considered for polling including those messages which are designated (or would be) as spam by a currently employed filter (e.g., personalized filter, Brightmail filter). Therefore, no messages are deleted, discarded, or sent to junk folders before they are considered for polling.

Each message or mail item received by the server has a set of properties corresponding to the mail transaction. The server compiles these properties and sends them along with the polling message to a central database. Examples of the properties include the recipient list (e.g., as listed in "To:", "cc:", and/or "bcc:" fields), verdict of a currently employed filter (e.g., whether filter identified message as spam), verdict of another optional spam filter (e.g., Brightmail filter), and user information (e.g., username, password, real name, frequency of messages polled, usage data , . . . ). The polling message and/or its contents, as well as the corresponding user/recipient are each assigned a unique identifier. The identifier can also be sent to the database and subsequently updated as needed.

At 214, the message(s) selected for polling (e.g., original message$_{1-M}$ where M is an integer greater than or equal to one) is modified to indicate to the user that the message$_{1-M}$ is a polling message$_{P1-PM}$ and then is delivered to the user for polling (at 216).

For example, the polling message can include the original message to be voted on as an attachment and a set of instructions on how to vote on the message. The set of instructions includes at least two buttons such as a "good mail" button and a "spam" button, for example. When the user clicks on one of the buttons (at 218) to classify the message as good mail or spam, the user is directed to a uniform resource locator (URL) that corresponds to a unique identifier for the classification that the user is submitting. This information is posted and the associated record in the central database for that original message$_{1-M}$ is updated.

At 216 or at any other suitable time during the process 200, the original message can optionally be delivered to the user. Thus, the user receives the message twice—once in its original form and again in its modified polling form.

At some later time, a new spam filter is created and trained at 220 based at least in part upon user feedback. Once the new spam filter has been created and trained, the filter can be employed immediately on the email server and/or can be distributed to client servers, client email software, and the like (at 222). Training and distributing a new or updated spam filter is an ongoing activity. Thus, the process 200 continues at 204 when a new stream of incoming messages is received. When new filters are built, older data is discarded or down weighted based on how long ago they were obtained.

The feedback system 100 and process 200 rely on the feedback of its participating users. Unfortunately, some users cannot be trusted or are simply lazy and fail to provide consistent and accurate classifications. The central database 112 (FIG. 1*a*) maintains histories of user classifications. Thus, the feedback system 100 can track the number of contradictions, the number of times the user changed his/her mind, responses of the user to known good mail or known spam, as well as the number or frequency of user replies to polling messages.

Figure 3:
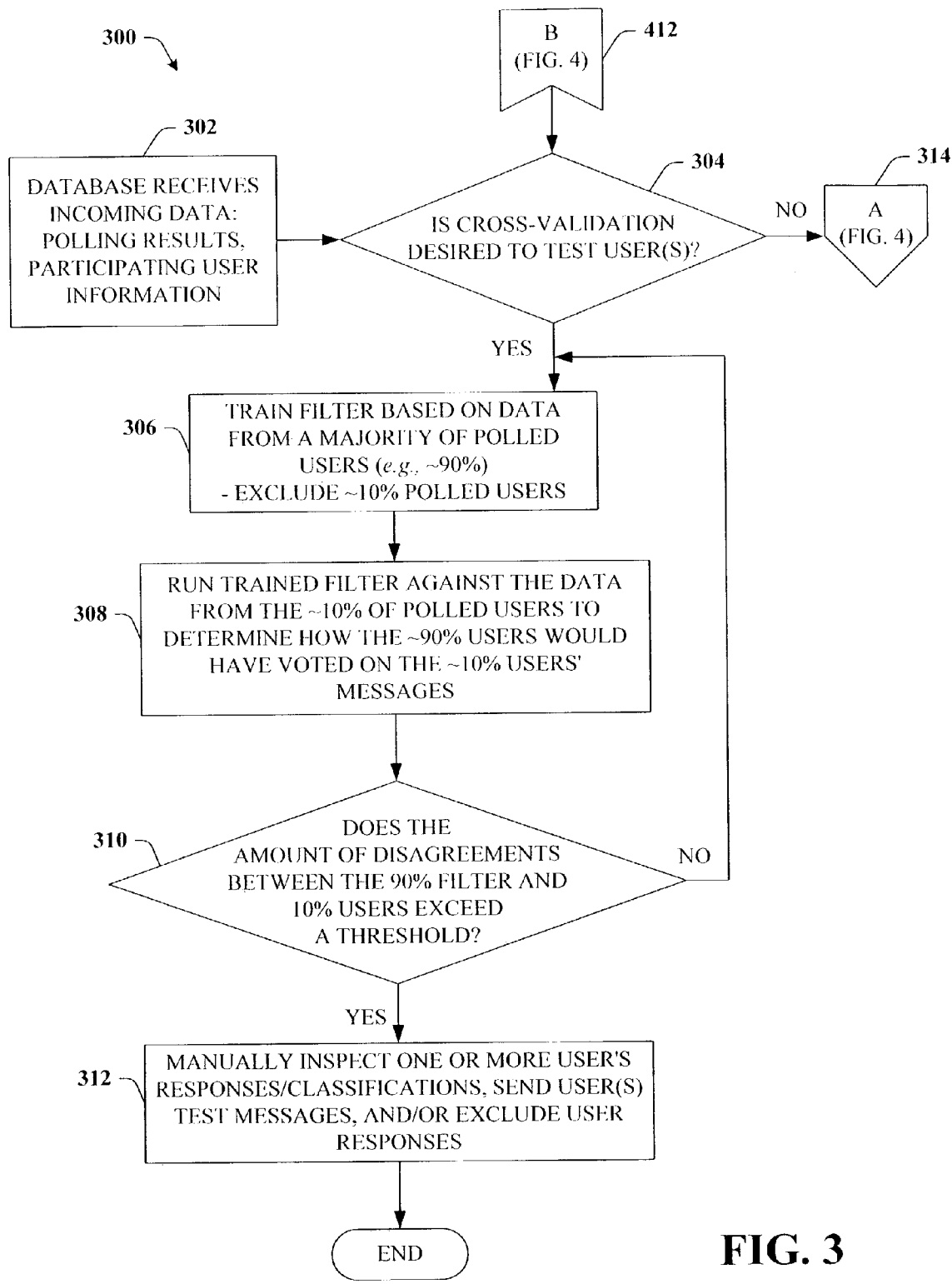
FIG. 3 is a flow diagram of an exemplary method that facilitates cross-validation of users participating in the method of FIG. 2 in accordance with an aspect of the present invention.

When any one of these numbers exceeds a prescribed threshold, or simply for every user of the system, the feedback system 100 can invoke one or several validation techniques to assess the trustworthiness of a particular user or users. One approach is a cross-validation method 300 as illustrated in FIG. 3 in accordance with another aspect of the present invention.

The cross-validation technique begins at 302 with a central database receiving incoming data such as polling results and respective user information. Next, it must be determined whether cross-validation is desired to test a suitable number of users at 304. If it is desired, then, a new spam filter is trained using some portion of the incoming data at 306. That is, the data from the users which are being tested is excluded from the training. For example, the filter is trained with about 90% of the polled user data (denoted as the 90% filter), thereby excluding about 10% of the data (denoted as the 10% tested user) which corresponds to the data submitted by the tested user.

At 308, the 90% filter is run against the remaining 10% tested user data to determine how the 90% users would have voted on the tested user's messages. If the amount of disagreements between the 90% filter and the 10% tested user data exceeds a prescribed threshold (at 310), then the user's classifications can be manually inspected at 312. Alternatively or in addition, test messages can be sent to the suspicious or untrustworthy users and/or these particular users can be excluded from future polling, and/or their past data discarded. However, if the threshold is not exceeded, then the process returns to 306. In practice, the cross-validation technique 300 can be utilized with any suitable set of test users, excluding different users as necessary to determine and maintain the trustworthiness of the voting/classification data.

A second approach to assess user fidelity and reliability includes training a filter on all data gathered in a given period, and then testing on the training data, using the filter. This technique is known as test-on-training. If a message was included in the training, the filter should have learned its rating, e.g., the learned filter should classify the message the same way that the user did. However, the filter may continue to make a mistake on it by labeling it as spam when the user labeled it is as not spam or vice versa. In order for a filter to disagree with its training data, the message has to strongly disagree with other messages. Otherwise, the trained filter would almost certainly have found some way to classify it correctly. Thus, the message can be discarded as having an unreliable label. Either this technique or cross validation may be used: cross-validation can yield more mistakes in classifications less reliably; conversely test-on-training finds fewer mistakes more reliably.

Both the test-on-training and the cross-validation technique 300 may be applied to individual messages wherein an individual user's classification or rating of a message is excluded by general agreement (e g., following the majority rating). Alternatively, both techniques can be used to identify potentially unreliable users.

Figure 4:
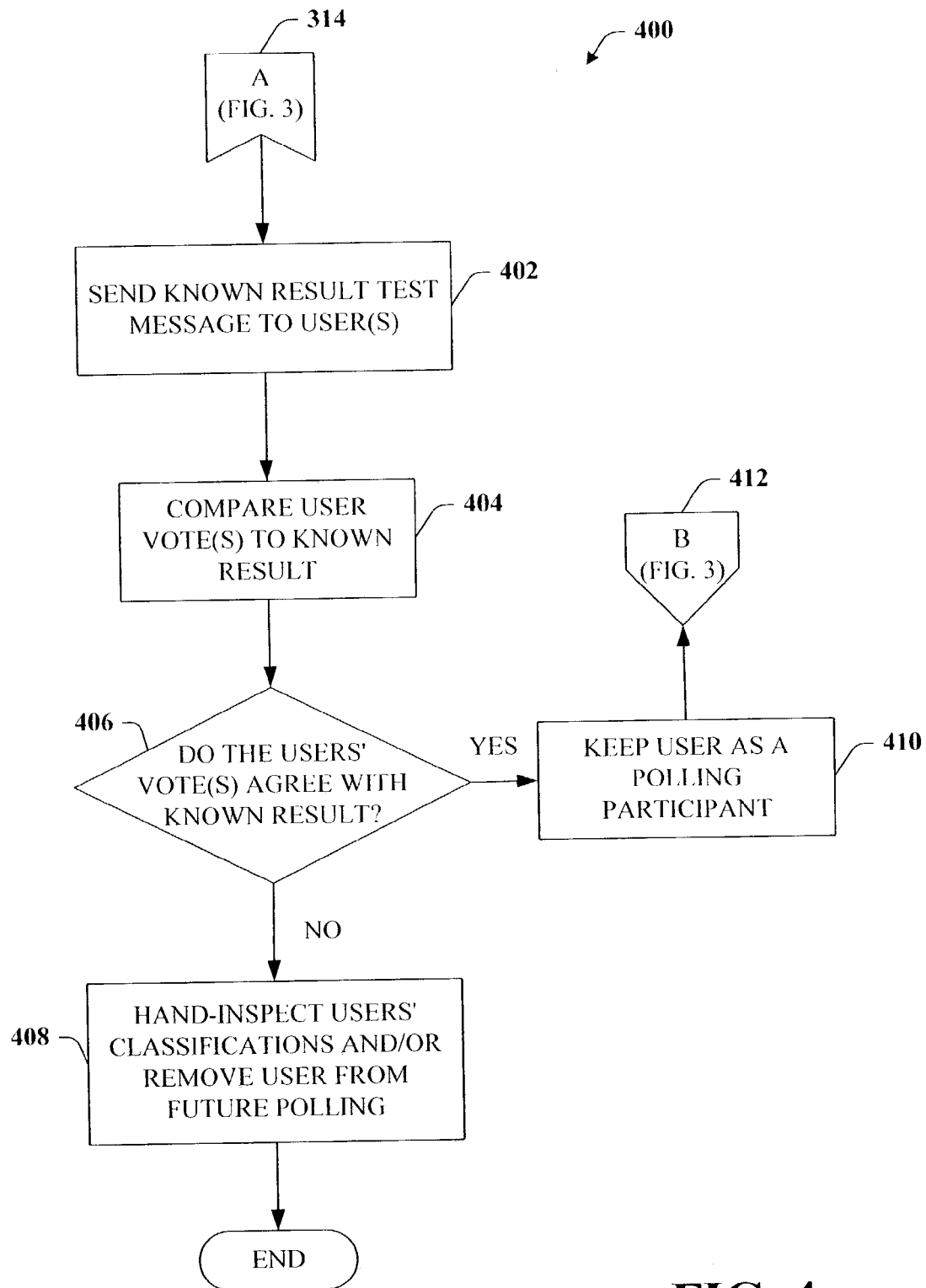
FIG. 4 is a flow diagram of an exemplary method that facilitates determining whether users are untrustworthy in accordance with an aspect of the present invention.

In addition to, or instead of cross validation and/or test on training techniques, we can use the "known-results" technique to verify user trustworthiness (follow 314 to FIG. 4). Although the techniques of FIGS. 3 and 4 are demonstrated separately, it should be appreciated that both approaches can be utilized at the same time. That is, information from known-good and known-spam messages can be combined with cross-validation or test on training results to determine which users to discard.

Referring now to FIG. 4, there is illustrated a flow diagram of a process 400 to validate the fidelity of user voting in accordance with one aspect of the invention. The process 400 refers from 314 as shown in FIG. 3. At 402, a known result test message(s) is sent to suspicious user(s) (or all users). For example, a test message may be injected into the incoming mail and then hand classified so that the database receives the "known" result. Otherwise, the process 400 can wait until a known result message is sent by a third party. The users are allowed to vote on the same test messages. The voting results are compared to the known results at 404. If the users' votes do not agree at 406, then their current and/or future and/or past classifications can be hand-inspected for a suitable period of time (at 408) until they demonstrate consistency and reliability. Alternatively, their current or future or past classifications can be discounted or removed. Finally, the users can be removed from future polling. However, if their voting results do agree with the test message results, then the users can be considered trustworthy at 410. The process 400 returns at 412 to FIG. 3 to determine what type of validation technique is desired for the next group of suspect users.

A fourth approach (not shown) to assess user reliability is active learning. With active learning techniques, messages are not picked at random. Instead, the feedback system can estimate how useful the message will be to the system. For instance, if the filter returns a probability of spam, one can preferentially select the messages which are most uncertainly classified by the current filter for polling, i.e., those whose probability of spam is closest to 50%. Another way to select messages is to determine how common the message is. The more common the message, then the more useful it is to poll. Unique messages are less useful because they are less common. Active learning can be employed by using the confidence levels of existing filters, using how common features of the message are, and using existing filter's confidence levels of its settings or content (e.g., metaconfidence). There are many other active learning techniques, such as query-by-committee, well known to those skilled in the art of machine learning, and any of these techniques can be used.

Figure 5:
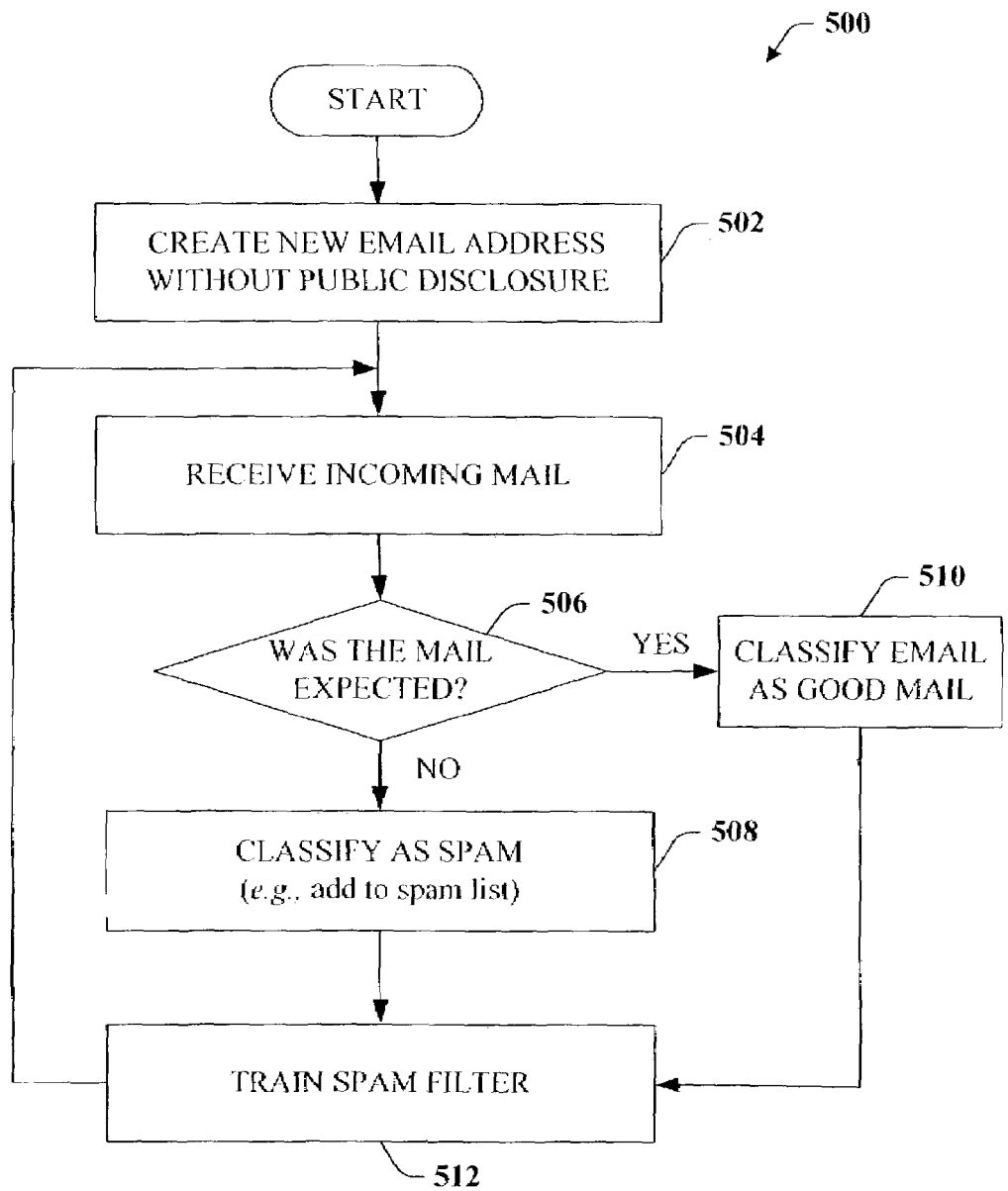
FIG. 5 is a flow diagram of an exemplary method that facilitates catching spam and determining spam originators in accordance with an aspect of the present invention.

Referring now to FIG. 5, there is illustrated a flow diagram of a process 500 for incorporating honeypot feedback in addition to user feedback into spam filter training in accordance with one aspect of the subject invention. Honeypots are email addresses to which it is known who should be sending them email. For example, a newly created email address may be kept private and disclosed only to selected individuals (at 502). They may also be disclosed publicly but in restrictive ways not seen by people (e.g., putting it on a white background in white typeface as a mail link). Honeypots are particularly useful in dictionary attacks by spammers. A dictionary attack is one in which a spammer tries emailing a very large number of addresses, perhaps all addresses in a dictionary or made from pairs of words in a dictionary or similar techniques in order to find valid addresses. Any email sent to a honeypot (at 504) or any email not from the few selected individuals (at 506) is considered spam (at 508). An email address can also be signed up with a suspect merchant. Thus, any email received from the merchant is considered good mail (at 510) but all other mail is considered spam. The spam filter can be trained accordingly (at 512). Moreover, the suspect merchant is determined to sell or otherwise disclose the user's information (e.g., at least the email address) to third parties.

This can be repeated with other suspect merchants and a list can be generated to warn users that their information could be distributed to spammers. These are just a few techniques of getting email sent to honeypots which can safely be considered spam. In practice, there are other alternative ways to get email sent to honeypots that can safely be considered spam.

Because honeypots are a good source of spam but a terrible source of legitimate mail, the data from honeypots can be combined with data from the feedback loop system (FIG. 1) to train new spam filters. Mail from different sources or different classifications can be weighed differently. For example, if there are 10 honeypots and 10 users who are polled on 10% of their mail, about 10 times as much spam is to be expected firm the honeypots as from polling. Therefore, the legitimate mail from polling can be weighted at 10 or 11 times as much as the spam in order to make up for this difference. Alternatively, honeypot data can be selectively down weighted. For example, about 50% of a user's mail is good mail and about 50% of it is spam. The same volume of spam is going to the honeypots. Therefore, it looks like the honeypot has 100% of spam, and all of it is sampled, not just 10%. In order to train with the correct ratios of spam and good mail in the combined system, the honeypot data is down weighted by 95% and the user spam is down weighted by 50% to result in a 1:1 overall ratio.

Other sources of spam reports include users who are not included as participants in the feedback loop system. For instance, there may be a "Report Spam" button available to all users for all mail, to report spam that has made it through the filter. This data can be combined with data from the feedback loop system. Again, this source of spam should be down weighted or weighted differently since it can be biased or untrustworthy in various aspects. Re-weighting should also be done to reflect the fact that only mail that was not filtered is subject to reporting by the "Report-as-spam" button.

In addition to the spam filter, a quarantine filter can be created and employed by the feedback loop system. The quarantine filter makes use of both positive and negative mail features. For example, mail from a popular online merchant is almost always good. A spammer exploits the system by mimicking an aspect of the good merchant mail in his spam. Another example is that the spammer intentionally tricks the feedback system by sending small amounts of good mail via an IP address. The feedback loop learns to classify this mail as good mail, when at such time, the spammer starts sending spam from the same IP address.

Thus, the quarantine filter notices a particular positive feature is being received in much greater quantities than the system is used to on the basis of historical data. This causes the system to be suspicious of the message and hence, quarantines it until sufficient poll results are obtained before choosing to deliver or mark the mail as spam. The quarantine filter can also be employed when mail is received from a new IP address, for which it is not known or certain whether the mail is spam or not spam and such will not be known for a while. Quarantining can be performed in a number of ways, including provisionally marking the mail as spam and moving it to a spam folder or by not delivering it to the user or storing it somewhere where it will not be seen. Quarantining can be done for messages that are near the spam filter threshold: it can be assumed that additional information from polling will help make a correct decision. Quarantining can also be done when many similar messages are received: a few of the messages can be sent for polling with the feedback loop, and the retrained filter can be used to correctly classify the messages.

In addition to building filters, the feedback loop system as described herein can be utilized to evaluate them as well. That is, parameters of the spam filters can be tuned as needed. For example, a filter is trained up through midnight of last night. After midnight, take data that comes into the database to determine error rates of the spam filter as compared to the users' classifications. Further, the feedback loop can be employed to determine false positive and catch rates of the spam filter. For example, the user votes can be taken and the mail can be run through a potential filter to determine the false positive and catch rates. This information can then be used to tune and optimize the filter. Different parameter settings or different algorithms can be manually or automatically tried by building several filters, each one using a different setting or algorithm, to obtain the lowest false positive and catch rates. Thus, the results can be compared to select the best or optimal filter parameters.

The feedback loop can be utilized for building and populating lists of IP addresses or domains or URLs that are always voted as spam or always voted as good, or voted at least 90% good, etc. These lists can be used for spam filtering in other ways. For instance, a list of IP addresses voted at least 90% spam could be used for building a black-hole list of addresses from which to accept no mail. The feedback loop can also be used to terminate the accounts of spammers. For example, if a particular user of an ISP appears to be sending spam, the ISP can be automatically notified. Similarly, if a particular domain appears responsible for a large amount of spam, the domain's email provider can be automatically notified.

There are a number of architectures that can be used to implement the feedback loop system. One exemplary architecture is served based, as will be described in FIG. 7, with the selection process happening when the mail reaches the email server. An alternate architecture is client based, as is described in FIG. 6. In a client-based feedback loop, polling information can be utilized to improve the performance of a personalized filter, or, in the exemplary implementation illustrated here, the information can be sent to a shared repository as training data for a shared filter (e.g. corporate wide, or global.) It should be appreciated that the following architectures described below are merely exemplary and can include additional components and features not depicted therein.

Figure 6:
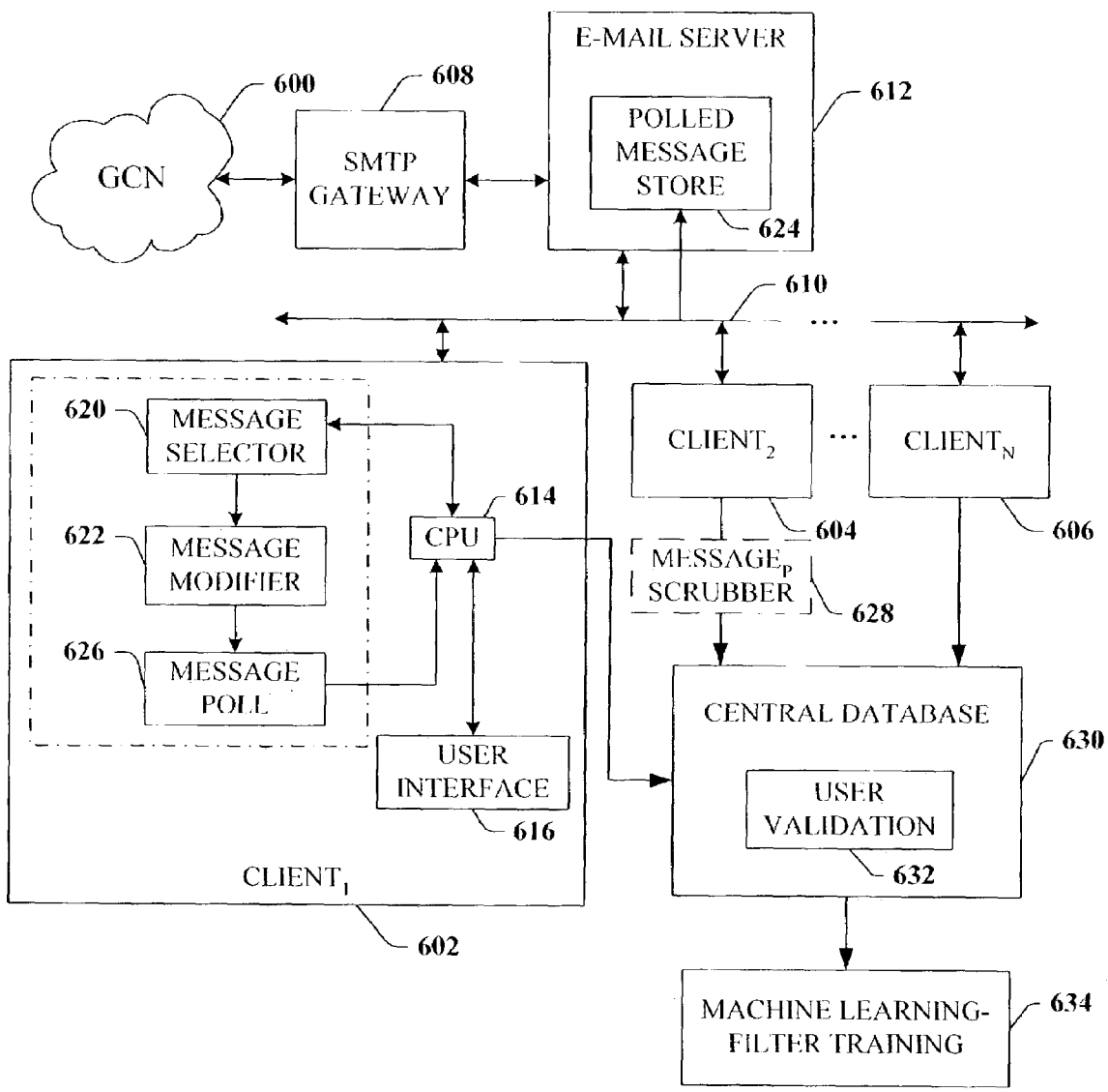
FIG. 6 is a block diagram of a client-based feedback loop architecture in accordance with an aspect of the present invention.

Referring now to FIG. 6, there is illustrated an exemplary general block diagram of a feedback loop technique in a client-based architecture. A network 600 is provided to facilitate communication of e-mail to and from one or more clients 602, 604, and 606 (also denoted as $CLIENT_1$, $CLIENT_2$... $CLIENT_N$, where N is an integer greater or equal to one). The network can be a global communication network (GCN) such as the internet, or a WAN (Wide Area Network), LAN (Local Area Network), or any other network configuration. In this particular implementation, an SMTP (Simple Mail Transfer Protocol) gateway server 608 interfaces to the network 600 to provide SMTP services to a LAN 610. An email server 612 operatively disposed on the LAN 610 interfaces to the gateway 608 to control and process incoming and outgoing email of the clients 602, 604, and 606. Such clients 602, 604, and 606 are also disposed on the LAN 610 to access at least the mail services provided thereon.

The client 602 includes a central processing unit (CPU) 614 that controls client processes. The CPU 614 can comprise multiple processors. The CPU 614 executes instructions in connection with providing any of the one or more data gathering/feedback functions described hereinabove. The instructions include, but are not limited to, the encoded instructions that execute at least the basic feedback loop methodology described above, at least any or all of the approaches that can be used in combination therewith for addressing client and message selection, polling message modification, data retention, client reliability and classification validation, reweighing of data from multiple sources including the feedback loop system, spam filter optimization and tuning, quarantine filters, creation of spams lists, and automatic notification of spammers to their respective ISPs and email providers. A user interface 616 is provided to facilitate communication with the CPU 614 and client operating system such that the client$_1$ can interact to access the email and vote on polling messages.

A sampling of client messages retrieved from the server 612 can be selected for polling by a message selector 620. Messages are selected and moldified for polling if the intended recipient (client) has previously agreed to participate. A message modifier 622 modifies the message to become a polling message. For example, the message(s) can be modified to include voting instructions and voting buttons and/or links according to the message modification descriptions provided hereinabove. Voting buttons and/or links are implemented by modifying the user interface 616 of the client email software. In addition, the message modifier 622 can remove any viruses in the messages (polling and non-polling messages) before they are opened or downloaded for viewing by the client 602.

In one implementation, the user of the spam fighting client 602 sees each message only once, with some messages specially marked as polling messages, and including voting buttons, etc. In the subject implementation, the user of the spam fighting client 602 may see some messages twice, wherein one is the normal message and the other is the polling message. This can be implemented in several ways. For instance, the polling message can be returned to the server 612 and stored in a polled message store Alternatively, the client 602 can store an additional message in the E-Mail server 612. Alternatively, the client 602 can show the user each message twice, once as a normal message, and once in modified form.

Polling results 626 can be sent to the CPU 614 and then to a database 630 which can be configured to store data from one client or from more than one client, depending on the specific arrangement of the client feedback architecture. The central database 630 stores polling messages, polling results as well as the respective client-user information. Related components can be employed to analyze such information such as to determine polling frequency, client-user trustworthiness (e.g., user validation 632), and other client statistics. Validation techniques can be employed particularly when the reliability of the client's voting is in question. Suspicion can arise from analyzing the number of contradictions, the number of changed minds, and the number of messages polled for a particular user or users; alternatively, validation techniques can be employed for every user. Any suitable amount of data stored in the central database can be employed in machine learning techniques 634 to facilitate the training of a new and/or improved spam filter.

Clients 604 and 606 include similar components as described hereinabove to obtain and train a filter which is personalized to the particular client(s). In addition to what has been described, a polled message scrubber 628 can interface between the CPU 614 and the central database 630 such that aspects of the polled message may be removed for a variety of reasons such as data aggregation, data compression, etc. The polled message scrubber 628 can flush out extraneous portions of the polled message as well as any undesired user information associated therewith.

Figure 7:
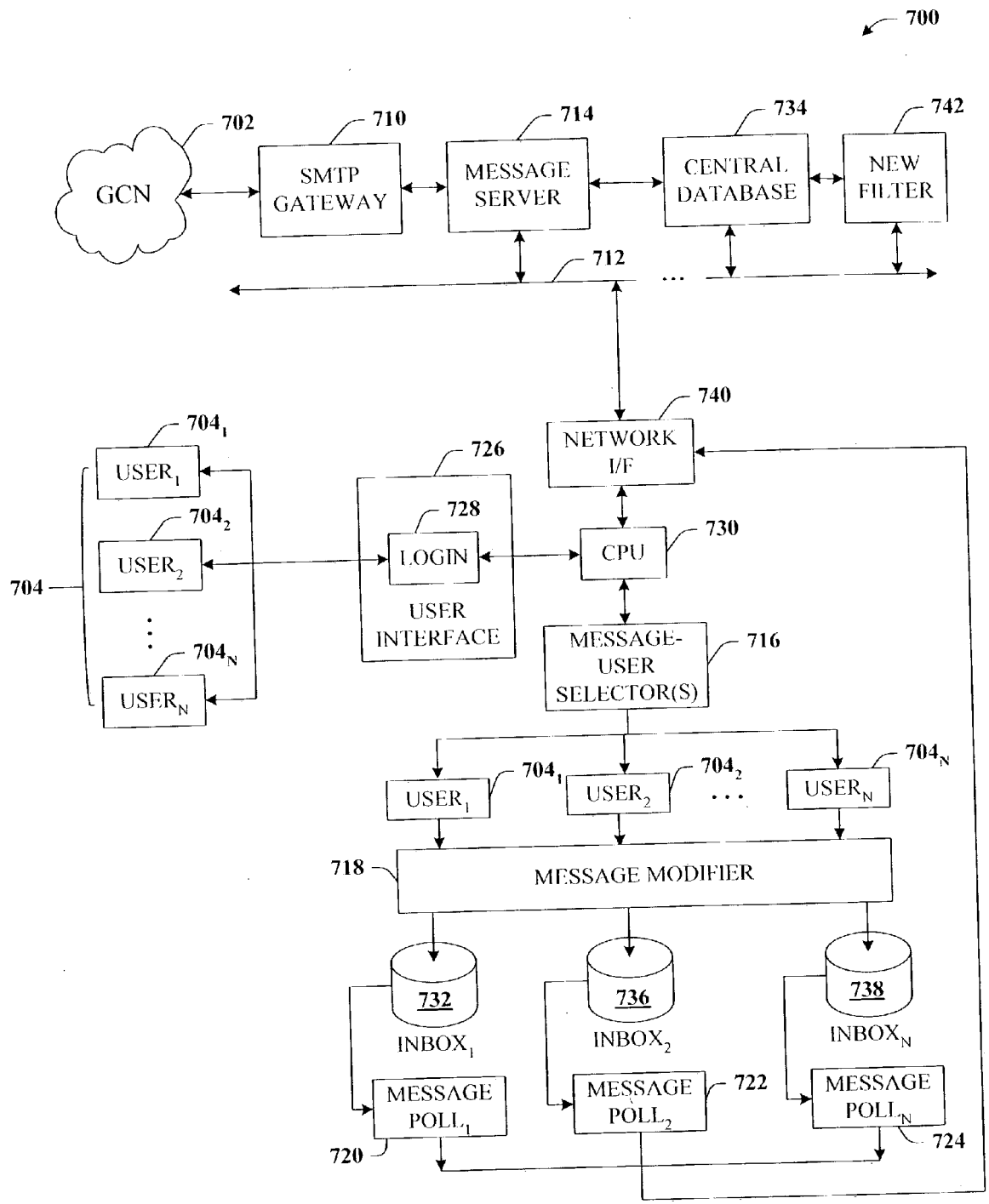
FIG. 7 is a block diagram of a server-based feedback loop system having one or more users that generate training data in accordance with an aspect of the present invention.

Referring now to FIG. 7, there is illustrated an exemplary server-based feedback loop system 700 that facilitates multi-user logins and that obtains polling data in accordance with the feedback loop techniques of the present invention. A network 702 is provided to facilitate communication of e-mail to and from one or more users 704 (also denoted as USER$_1$ 704$_1$, USER$_2$ 704$_2$... and USER$_N$ 704$_N$, where N is an integer greater or equal to one). The network 702 can be a global communication network (GCN) such as the internet, or a WAN (Wide Area Network), LAN (Local Area Network), or any other network configuration. In this particular implementation, an SMTP (Simple Mail Transfer Protocol) gateway server 710 interfaces to the network 702 to provide SMTP services to a LAN 712. An email server 714 operatively disposed on the LAN 712 interfaces to the gateway 710 to control and process incoming and outgoing email of the users 704.

The system 700 provides multiple login capability such that user and message selection 716, message modification 718, and message polling (720, 722, 724) takes place for each different user that logs into the system 700. Thus, there is provided a user interface 726 that presents a login screen as part of the boot-up process of the computer operating system, or as required, to engage an associated user profile before the user 704 can access his or her incoming messages. Thus, when a first user 704$_1$ (USER$_1$) chooses to access the messages, the first user 704$_1$ logs into the system via a login screen 728 by entering access information typically in the form of a username and password. A CPU 730 processes the access information to allow the user access, via a message communication application (e.g., a mail client) to only a first user inbox location 732.

When incoming mail is received on the message server 714, they are randomly selected for polling which means that at least one of the messages is tagged for polling. The intended recipient(s) of the tagged messages are looked at to determine whether any one of the recipients is also a designated spam fighting user. Recipient properties indicating such information can be maintained on the message server 714 or on any other component of the system 700 as appropriate. Once it is determined which of the intended recipients are also spam fighters, a copy of their respective mail as well as any other information regarding the mail transaction can be sent to a central database 734 for storage. Messages tagged for polling are modified by the message modifier 718 in any number of ways described hereinabove. Messages selected for polling may also be specific to the user 704. For example, the user 704 can indicate that only certain types of messages are available for polling. Since this can result in a biased sampling of data, such data can be re-weighted with respect to other client data to mitigate building disproportionate training data sets.

Virus scanning of the polling messages can also be performed at this time or at any other time before the polling message is downloaded and/or opened by the user 704. Once the messages have been modified in the appropriate manner, they are delivered to the respective user's inboxes which are denoted as INBOX$_1$ 732, INBOX$_2$ 736, and INBOX$_N$ 738, where they can be opened for polling. To facilitate the polling process, each polling message includes two or more voting buttons or links, which when selected by the user, generates information relating to the polling message and the polling result. The text of each polling message can be modified to incorporate the voting buttons or links therein.

Message poll results (denoted as MESSAGE POLL$_1$ 720, MESSAGE POLL$_2$ 722, and MESSAGE POLL$_N$ 724.), which include any information resulting from the classification (e.g., polling message or ID associated therewith, user properties), are sent to the central database 734 via a network interface 740 on the LAN 712. The central database 734 can store polling and user information (720, 722, 724) from the respective users to apply to machine learning techniques to build or optimize a new and/or improved spam filter 742. However, for privacy and/or security reasons, confidential information can be removed or stripped out of the information before it is sent to the central database 714.

Information generated by the user(s) 704 via polling can also be aggregated into statistical data. Thus, less bandwidth is used to transmit the information.

The newly trained spam filter 742 can then be distributed to other servers (not shown) as well as client email software (not shown) interfacing with the LAN 712 on an ongoing basis, such as when a new filter is available, either by specific request or automatically. For example, the newest spam filter can be automatically pushed out to them and/or made available for downloading via a website. As new training data sets are generated to build newer spam filters, older data sets (e.g., information previously obtained and/or employed to train a filter) can be discarded or discounted depending on the age of the data.

Consider now an alternate scenario wherein an organization devoted to spam fighting makes available a filter shared by many different filter-using organizations. In one aspect of the invention, the filter provider is also a very large provider of email services (e.g. paid and/or free email accounts). Rather than relying exclusively on email from its own organization, the filter provider chooses to also use some data from some of the filter-using organizations, so as to better capture the range of good mail and spam. The feedback loop system as described hereinabove can also be employed in such a cross-organizational scenario, either in a server or client-based architecture. We will call the filter provider, who aggregates data from its own users and from the different filter-using organizations the "internal" organization and call the components residing at one of the participating filter using organizations "external." In general, the cross-organizational system includes a mail database server at the filter provider (internal), such as, but not limited to, Hotmail and one or more message servers (external) such as those which may reside within one or more individual companies. In this case, the internal mail database server also stores substantial email feedback from its own customers. According to this aspect of the subject invention, training data sets may be generated based on information stored on an internal database (e.g., free e-mail/messaging on a Hotmail or MSN server) as well as information stored on one or more external databases associated with the respective external servers. Information maintained on the external databases can be communicated to the internal server via a network such as the Internet, for example, for employment in machine learning techniques. Ultimately data from the external databases can be utilized to train new spam filters and/or improve existing spam filters located externally (e.g., within the respective company) or associated with the internal mail server.

The data from one or more of the external databases should include at least one of polling messages, polling results (classifications), user information/properties, and voting statistical data per user, per group of users or on average for each company. The voting statistical data facilitate determining reliability of the information generated by the respective companies as well as mitigating bias of external data. Thus, the data from one or more external databases (companies) can be re-weighted or weighted differently from one or more of the other external databases. Moreover, the external entities can be tested for reliability and trustworthiness using similar validation techniques as described with hereinabove.

For company security, privacy and confidentiality, the information or data communicated across the Internet from each company to the e-mail server, for example, can be scrubbed, abbreviated, and/or condensed from its original form. The original form can be maintained on the respective external database and/or otherwise treated according to each company's preferences. Thus, the e-mail server or any other internal mail server receives only pertinent information necessary to generate training data such as spam classifications, sender domain, sender name, content of messages classified as spam, and the like.

Figure 8:
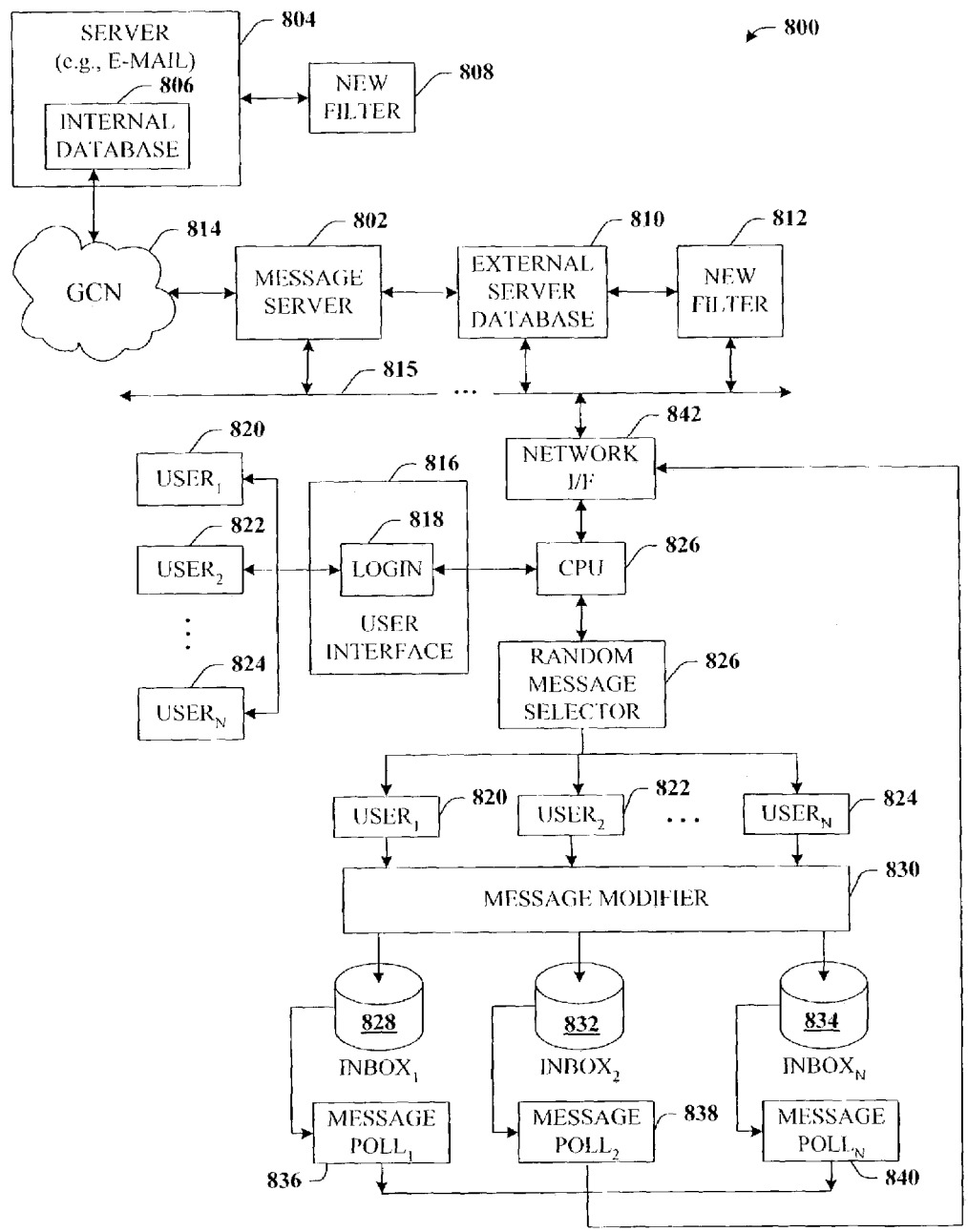
FIG. 8 is a block diagram of a cross-organizational server-based feedback loop system wherein the system includes an internal server with its own database to pull training data stored on external user databases in accordance with an aspect of the present invention.

Referring now to FIG. 8, there is illustrated an exemplary cross-organizational feedback system 800 where an internal database server and an external mail server can communicate and exchange database information via a network to facilitate the generation of training data sets used in machine learning techniques to build improved spam filters. The system 800 includes at least one external message server 802 (e.g., associated with at least one company) and an internal database server 804. Due to the nature of the cross-organization system, the external server 802 and the internal e-mail server 804 respectively maintain their own databases. That is, the e-mail server 804 is associated with an internal database 806 that can also be used to train a new spam filter 808. Likewise, the external server 802 is associated with an external database 810 which can be employed to train at least one new spam filter 812 as well as the spam filter 808 located internally with respect to the e-mail server 804. Thus, the information stored on the external database 810 can be utilized to train the spam filter 808 located on the e-mail server.

A GCN 814 is provided to facilitate communication of information to and from the internal e-mail server 804 and one or more external message servers 802. The external server(s) component of a cross-organizational system operates in a similar manner as does a server-based feedback loop system (e.g., FIG. 7, supra). For example, the message server 802, external database 810 and filter 812 can be located on a LAN 815. In addition, there is provided a user interface 816 that presents a login screen 818 as part of the boot-up process of the computer operating system, or as required, to engage an associated user profile before the user(s) can access his or her incoming messages.

In this server-based system, one or more users (denoted as $USER_1$ 820, $USER_2$ 822, $USER_N$ 824) can log into the system at the same time in order to make use of the available mail services. In practice, when a first user 820 ($USER_1$) chooses to access the messages, the first user 820 logs into the system via a login screen 818 by entering access information typically in the form of a username and password. A CPU 826 processes the access information to allow the user access to only a first user inbox location 828 via a message communication application (e.g., a mail client).

When incoming mail is received on the message server 802, messages are randomly or specifically targeted for polling. Before messages can be selected for polling, the intended recipients of such targeted messages are compared to a spam-fighter user list to determine whether any one of the recipients is also a designated spam fighting user. Recipient properties indicating such information can be maintained on the message server 802, database 810, or on any other component of the system 800 as appropriate. Once it is determined which of the intended recipients are also spam fighters, the message(s) are selected for polling and a copy of polling message(s) as well as any other information pertaining to the mail transaction can be sent to the database 810.

Messages selected for polling are modified by a message modifier 830 in any number of ways described hereinabove. In practice, a unique identification (ID) can be assigned to each polling message, to each spams fighter, and/or to each polling result and stored in the database 810. As previously mentioned, messages selected for polling can be randomly chosen or may be specific to the respective user(s) (820, 822, and 824). For example, the USER$_1$ 820 can indicate that only certain types of messages are available for polling (e.g. messages sent from outside of the company). Data generated from such specific messages is re-weighted and/or discounted to mitigate obtaining a biased sampling of data.

Virus scanning of the polling messages can also be performed at this time or at any other time before the polling message is downloaded and/or opened by the user. Once the messages have been modified in the appropriate manner, they are delivered to the respective user(s)'s inboxes which are denoted as INBOX$_1$ 828, INBOX$_2$ 832, and INBOX$_N$ 834, where they can be opened for polling. To facilitate the polling process, each polling message includes two or more voting buttons or links, which when selected by the user, generates information relating to the polling message and the polling result. The text of each polling message can be modified to incorporate the voting buttons or links therein.

Message poll results (denoted as MESSAGE POLL$_1$ 836, MESSAGE POLL$_2$ 838, and MESSAGE POLL$_N$ 840.), which include any information resulting from the classification (e.g., polling message or ID associated therewith, user properties), are sent to the database 810 via a network interface 842 located on the LAN 815. The database 810 stores polling and user information from the respective users for later use in machine learning techniques which are employed to build and/or optimize a new and/or improved spam filter(s) 812, 808.

For privacy reasons, each company may want to strip out key information before sending the polled message and/or user information to either its own database 810 and/or to the e-mail database 806 over the GCN 814, for example. One approach is to only provide feedback to the database (806 and/or 810) on spam messages, thereby excluding feedback on legitimate mail. Another approach is to only provide a partial subset of information on the legitimate mail such as the sender and the sender's IP address. Another approach is, for selected messages, such as those marked as good by the user that would be marked as bad by the filter, or vice versa, to explicitly ask for user permission before sending them to the filter. Any of these approaches or a combination thereof facilitates maintaining privacy of confidential information for the participating clients while continually providing data to train the spam filter(s) (808 and/or 812).

User validation schemes such as those described hereinabove can also be applied to each company as well as to each user within the company. For example, the users can individually be subjected to cross-validation techniques wherein the classifications of a suspect user(s) are excluded from filter training. The filter is trained using the data from the remaining user(s). The trained filter then runs through the messages from the excluded user(s) to determine how it would have classified the messages. If the number of disagreements exceeds a threshold level, then the suspect user(s) is considered untrustworthy. Future message classifications from the untrustworthy user(s) can be manually inspected before they are accepted by the database and/or filter. Otherwise, the user(s) can be removed from future polling.

Figure 9:
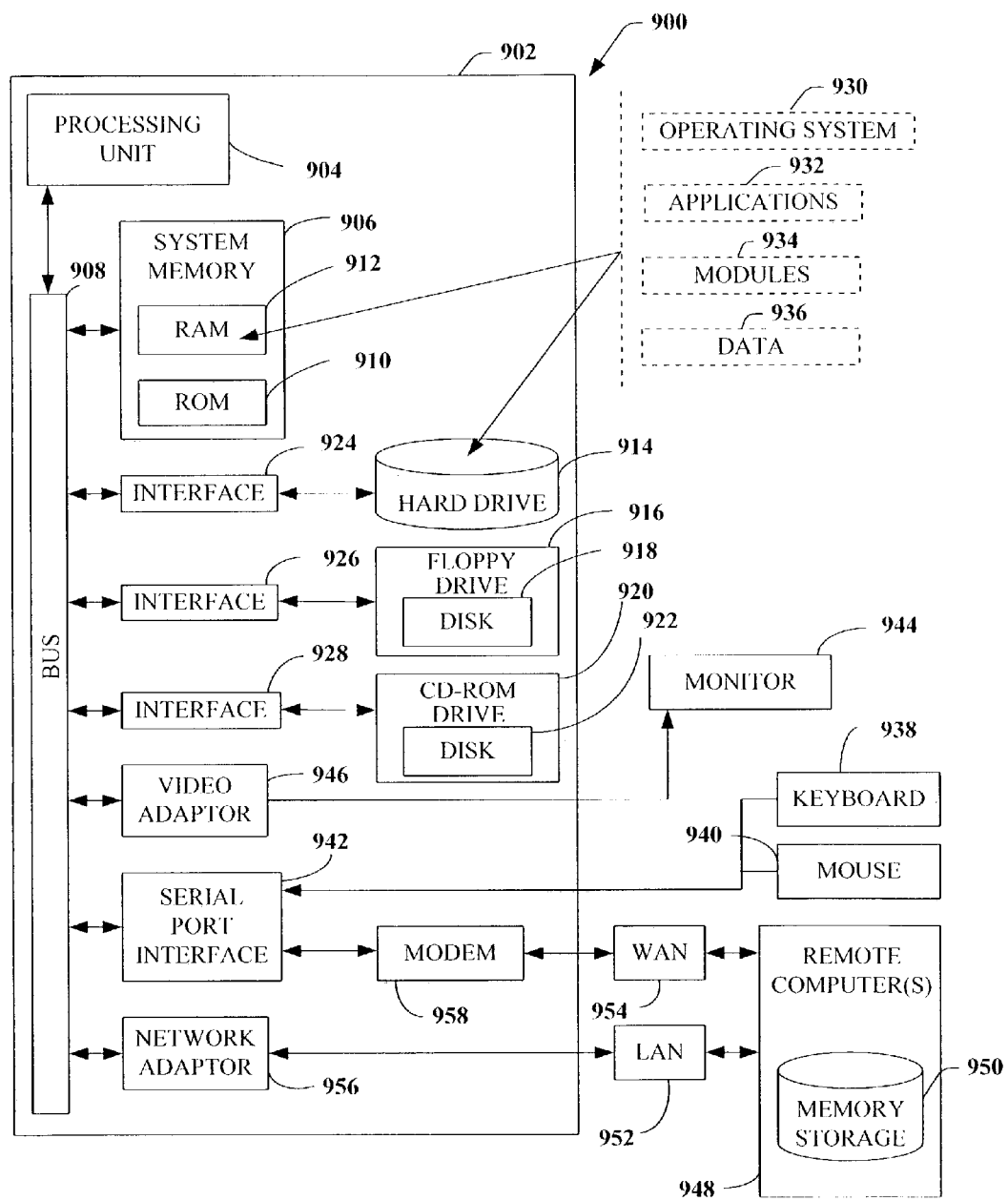
FIG. 9 illustrates an exemplary environment for implementing various aspects of the invention.

Referring now to FIG. 9, an exemplary environment 910 for implementing various aspects of the invention includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/nonremovable, volatile/nonvolatile computer storage media. FIG. 9 illustrates, for example disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that the present invention can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like.

These and other input devices connect to the processing unit 914 through the system bus 918 via interlace port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to the computer 912 and to output information from the computer 912 to an output device 940. Output adapter 942 is provided to illustrate that there are some output devices 940 like monitors, speakers, and printers among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

Figure 10:
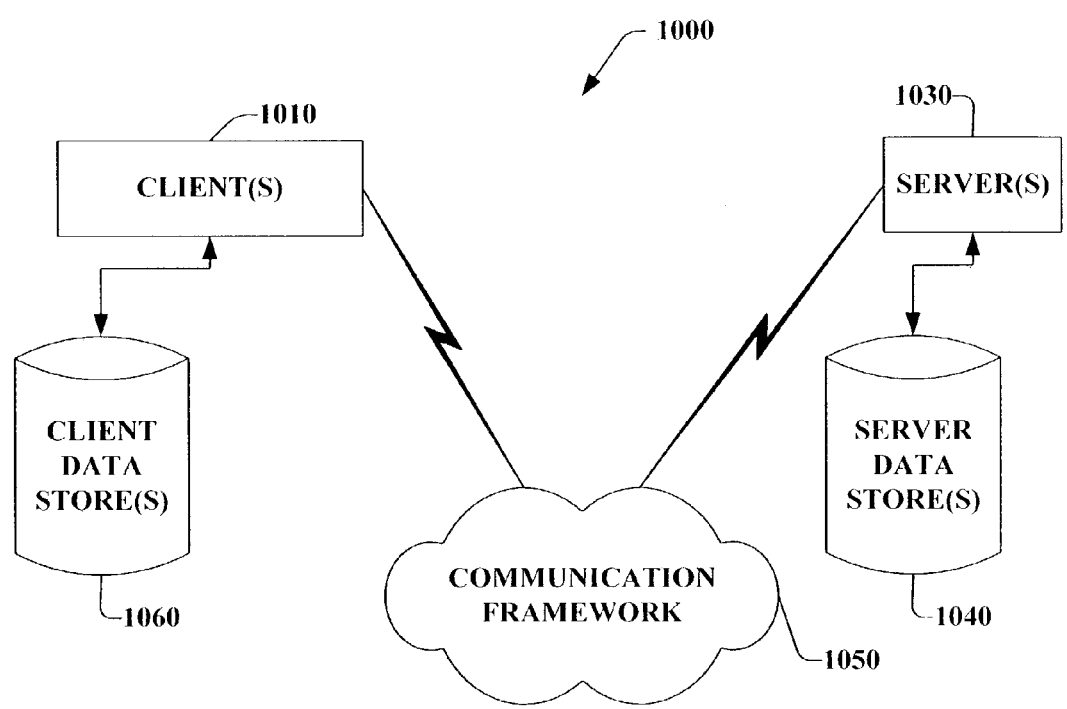
FIG. 10 is a schematic block diagram of an exemplary communication environment in accordance with the present invention.

FIG. 10 is a schematic block diagram of a sample computing environment 1000 with which the present invention can interact. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the present invention, for example. One possible communication between a client 1010 and a server 1030 may be in the form of a data packet adapted to be transmitted between two or more computer processes. The system 1000 includes a communication framework 1050 that can be employed to facilitate communications between the client(s) 1010 and the server(s) 1030. The client(s) 1010 are operably connected to one or more client data store(s) 1060 that can be employed to store information local to the client(s) 1010. Similarly, the server(s) 1030 are operably connected to one or more server data store(s) 1040 that can be employed to store information local to the servers 1030.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, that facilitates classifying items in connection with spam prevention, comprising computer-executable components embodied on a computer-readable storage medium, the system comprising:
   a component that receives a set of the items;
   a component that identifies intended recipients of the items, and tags a subset of the items to be polled, the subset of items corresponding to a subset of recipients that are known spam fighting users, wherein the subset of the items to be polled is determined before the items are labeled as spam or not spam, as such all items are considered for polling including those items which are designated as spam by a currently employed spam filter;
   a feedback component that receives information relating to the spam fighter's classification of the polled items, and employs the information in connection with training a spam filter and populating a spam list, wherein the feedback component employs machine learning techniques to train the spam filter; and
   a component that modifies an item tagged for polling to identify it as a polling item, wherein the modified item comprises voting instructions and any one of at least two voting buttons and links which correspond to at least two respective classes of items facilitate classification of the item by the user, wherein the voting buttons correspond to respective links such that when any one of the voting buttons is selected by the user, information relating to the selected voting button, the respective user, and the item's unigue ID assigned thereto is sent to a database for storage.

2. The system of claim 1, wherein the items comprise at least one of: electronic mail (email) and messages.

3. The system of claim 1, wherein the component that receives a set of the items is any one of an email server, a message server, and client email software.

4. The system of claim 1, wherein the subset of items to be polled comprises all of the items received.

5. The system of claim 1, wherein the subset of recipients comprises all recipients.

6. The system of claim 1, wherein the subset of recipients are randomly selected.

7. The system of claim 1, wherein the subset of recipients comprises paying users of the system.

8. The system of claim 1, wherein at least a subset of messages that would ordinarily be filtered are considered for polling.

9. The system of claim 1, wherein the subset of items tagged for polling is limited to at least one of the following:

a number of the items selected per user;

a number of the items selected per user per time period; and a probability of tagging an item corresponding to a known user.

10. The system of claim 1, wherein the tagged items are each assigned a unique ID, the unique ID corresponding to any one of the tagged item and contents of the tagged item.

11. The system of claim 1, wherein the modified item comprises at least one of the following:

a modified "from" address;

a modified subject line;

a polling icon; and a polling color for identification as a polling item.

12. The system of claim 1, wherein the modified item comprises the tagged item as an attachment.

13. The system of claim 1, wherein the modified item comprises a summary of the tagged item, the summary comprising at least one of a subject, a date, text of the message, and a first few lines of the text.

14. The system of claim 1, wherein the at least two voting buttons comprise a first voting button, the first voting button indicating "legitimate mail" and a second voting button, the second voting button indicating "spam".

15. The system of claim 1, wherein the voting buttons are implemented by modifying text of the item.

16. The system of claim 1, wherein the voting buttons are implemented by modifying a user interface of client email software.

17. The system of claim 1, further comprising a central database that stores information and data relating to user properties, item content and properties associated with tagged items, user classification and voting statistical data, frequency analysis data of polling per user and of polling per user per time period, spain lists, legitimate mail lists, and black hole lists.

18. The system of claim 1, wherein items tagged for polling that are marked as spam by an existing filter are delivered to the user's inbox and considered for polling.

19. The system of claim 1, wherein items tagged for polling are scanned for viruses such that one of the following occurs:

detected viruses are stripped out and the items are polled; and infected items are discarded.

20. The system of claim 1 distributed across more than one spain-fighting company such that feedback from each company is sent to a central database operatively interfaced with each company, wherein some portion of the feedback is removed for privacy reasons.

21. The system of claim 20, wherein the company feedback comprises one of the following:

only spain items, thereby excluding legitimate items; and spam items and sender name, domain name and IP address of legitimate items.

22. The system of claim 1, further comprising a user classification validation component that tests user reliability and trustworthiness.

23. The system of claim 22, wherein the user classification validation component is at least one of a cross-validation technique and a known result test message technique.

24. The system of claim 22, wherein the user classification validation component can be applied to one or more suspected users.

25. The system of claim 1, wherein the feedback component receives information relating to user feedback, honeypot feedback, and optionally, user recipient feedback of received items.

26. A method that facilitates classifying messages in connection with spam prevention comprising:

receiving a set of the messages;

identifying intended recipients of the messages;

tagging a subset of the messages to be polled, the subset of messages corresponding to a subset of the recipients that are known spam fighting users, wherein the subset of messages to be polled is determined before the messages are labeled as spam or not spam, as such all messages are considered for polling including those messages which are designated as spam by a currently employed spam filter;

receiving information relating to the user's classification of polling messages;

employing the information in connection with training a spam filter and populating a spam list, wherein training the spam filter is employed via a machine learning technique; and modifying a message tagged for polling to identify it as a polling message, wherein the modified message comprises voting instructions and any one of at least two voting buttons and links which correspond to at least two respective classes of messages facilitate classification of the message by the user, wherein the voting buttons correspond to respective links such that when any one of the voting buttons is selected by the user, information relating to the selected voting button, the respective user, and the message's unique ID assigned thereto is sent to a database for storage.

27. The method of claim 26, wherein at least a subset of messages that would ordinarily be filtered are received by an email server and into a feedback loop system.

28. The method of claim 26, wherein all incoming messages are handled by client email software such that messages selected for polling are specific to preferences of an individual user.

29. The method of claim 26, wherein all messages received are considered for polling to mitigate bias of data.

30. The method of claim 26, wherein the subset of messages to be polled comprises all messages.

31. The method of claim 26, wherein the subset of recipients comprises all recipients.

32. The method of claim 26, wherein the subset of recipients which are known spam fighting users is determined by each recipient performing at least one of the following:

opting in to provide feedback on messages to facilitate training a new spam filter;

passively opting in to provide feedback on messages by not opting out;

paying for email and message services provided by a participating message server; and opening an email account with a participating message server.

33. The method of claim 26, wherein the subset of users selected to participate in the message polling is selected at random.

34. The method of claim 26, wherein the subset of users selected to participate in the message polling are selected from all paying users, thereby making it more expensive for some spammers to subvert the spam filter training.

35. The method of claim 26, wherein the subset of messages tagged for polling are selected at random.

36. The method of claim 26, wherein the subset of messages tagged for polling is limited by one or more polling limits.

37. The method of claim 26, wherein the one or more polling limits comprise a per user limit and a per user per time period limit to mitigate bias of data.

38. The method of claim 26, further comprising modifying tagged messages to mark and identify them as polling messages.

39. The method of claim 38, wherein modifying the tagged messages comprises performing at least one of the following:
moving the tagged message to a separate folder for polling messages;
modifying the "from" address of the tagged message;
modifying the subject line of the tagged message;
using a polling icon on the tagged message to identify it as a polling message; and
using a unique color to identify the tagged message as a polling message.

40. The method of claim 26, wherein the polling message comprises an attachment of the message as originally received and a set of instructions instructing the user on how to vote.

41. The method of claim 40, further comprising at least two voting buttons to facilitate classifying the message as spam and not spam.

42. The method of claim 41, further comprising a third voting button to opt out of future polling.

43. The method of claim 41, wherein the voting buttons are incorporated into the polling message by modifying text of the message before sending the polling message to the respective user.

44. The method of claim 41, wherein the voting buttons are implemented by modifying a user interface of client email software.

45. The method of claim 41, wherein the voting buttons are incorporated into the polling message.

46. The method of claim 40, further comprising a summary of the message, the summary comprising at least one of a subject line, message sender, date the message was sent, date the message was received, and a first few lines of text from the message.

47. The method of claim 26, further comprising scanning the tagged messages for viruses before they are downloaded for polling.

48. The method of claim 47, further comprising removing the viruses from any infected messages.

49. The method of claim 47, wherein tagged messages infected with a virus are discarded.

50. The method of claim 26, further comprising making a copy of each tagged message as originally received such that the respective users receive a first copy of the message in its original form and a second copy of the message in a form for polling.

51. The method of claim 26, wherein the tagged messages are individually assigned a unique ID corresponding to at least one the tagged message and contents of the tagged message.

52. The method of claim 51, wherein the tagged message and its associated ID are stored in a database in connection with training a spam filter and populating a spam list.

53. The method of claim 26, wherein a feedback component receives the information relating to the user's classification of the polling message, the feedback component comprising a central database.

54. The method of claim 53, wherein the database provides information in connection with training a spam filter and populating a spam list via a machine-learning technique.

55. The method of claim 53, wherein identifying users and tagging messages for polling is distributed across one or more mail servers and one or more client email software such that data generated by the mail servers and client email software are returned to a central database for storage in connection with training a spam filter and populating a spam list.

56. The method of claim 55, wherein key information is removed from any data that is sent to the central database by the mail servers and client email software for privacy reasons, such that only a portion of the data is sent to the central database to facilitate training the spam filter.

57. The method of claim 56, wherein the portion of data sent to the central database comprises at least one of the following:
information relating to spam messages;
domain names embedded in legitimate messages; and
IP addresses embedded in legitimate messages.

58. The method of claim 55, wherein the data generated by the mail servers and the data generated by the client email software are aggregated into statistical data, respectively, corresponding to polling results and polling messages, thus mitigating bandwidth required to transmit the data to the central database.

59. The method of claim 58, wherein the messages are selected using active learning techniques, i.e. techniques that select messages based on their estimated value to learning new or updated filters.

60. The method of claim 26, wherein the spam filter is trained using messages classified as spam and not spam to mitigate bias of polling data and misclassification of the polling messages.

61. The method of claim 26, further comprising distributing the trained spam filter to one or more servers, the distribution occurring automatically and/or by request by at least one of an email message and a posting on a website for downloading.

62. The method of claim 26, wherein training the spam filter and populating the spam list is performed by machine learning techniques using data based on user classification feedback and optionally, data generated by one or more additional sources, the one or more sources comprising honeypots, recipient non-user classification feedback, and active learning techniques.

63. The method of claim 62, wherein data generated by the one or more sources is re-weighted proportionately with respect to the type of data generated by the source and relative to the user classification data to facilitate obtaining an unbiased sampling of data.

64. The method of claim 62, wherein honeypots correspond to email addresses disclosed in a restrictive manner such that it is known who is sending them legitimate messages, thereby facilitating immediate identification of spammers, verification of suspect merchants who distribute user subscriber information to spammers, and immediate classification of spam messages without waiting for user classification.

65. The method of claim 64, wherein information generated by the honeypots is down weighted selectively depending at least in part on a number of honeypots in use relative to a number of other sources including user classification feedback.

66. The method of claim 64, wherein data generated by the honeypots is integrated in real time into a central database, where information relating to user classifications and polling messages are also stored for later use in connection with training a spam filter and populating a spam list.

67. The method of claim 26 further comprising:
monitoring incoming messages for their respective one or more positive features;
determining a frequency of positive features received;
determining whether one or more positive features received exceeds a threshold frequency based at least in part upon historical data; and
quarantining suspicious messages, which correspond to the one or more positive features that exceed the threshold frequency, until further classification data is available to determine whether suspicious messages are spam.

68. The method of claim, 67 wherein the feature used is information about the sender comprising at least one of the sender's IP address and domain.

69. The method of claim 67, wherein quarantining suspicious messages is performed by at least one of the following acts:
provisionally labeling the suspicious messages as spam and moving them to a spam folder;
delaying delivery of the suspicious messages to the user (s) until further classification data is available; and
storing the suspicious messages in a folder not visible to the user(s).

70. The method of claim 26, further comprising determining false positive and catch rates of the spam filter to facilitate optimization of the spam filter, wherein determining false positive and catch rates compnses:
training the spam filter using a training data set, the training data set comprising a first set of polling results;
classifying a second set of polling messages using user feedback to yield a second set of polling results;
running the second set of polling messages through the trained spam filter;
comparing the second set of polling results to the trained spam filter results to determine false positive and catch rates of the filter to thereby evaluate and tune filter parameters according to optimal filter performance.

71. The method of claim 70, wherein more than one spam filter is built, each having different parameters and each being trained on the same training data set, such that the false positive and catch rates of each spam filter is compared to at least one other spam filter to determine optimal parameters for spam filtering.

72. The method of claim 26, further comprising building an improved spam filter using additional sets of incoming messages, subsets of which are subjected to polling to yield new information in connection with training the improved spam filter, wherein previously obtained information is re-weighted based at least in part upon how long ago it was obtained.

73. The method of claim 26, further comprising employing the information to build a legitimate sender list.

74. The method of claim 73, wherein the legitimate sender list comprises any one of IP addresses, domain names, and URLs that are substantially classified as sources of good mail according to a percentage of messages classified as good.

75. The method of claim 26, wherein the spam lists are used to generate a black hole list of addresses from whom no mail would be accepted.

76. The method of claim 26, further comprising employing the information to facilitate terminating accounts of spammers.

77. The method of claim 76, further comprising identifying a spammer who is using an ISP and automatically notifying the ISP of the spamming.

78. The method of claim 76, further comprising identifying a domain responsible for sending spam, and automatically notifying at least one of the domain's email provider and the domain's ISP of the spamming.

79. The method of claim 26, further comprising distributing at least one of the spam filter and the spam list to any one of mail servers, email servers, and client email software, wherein distributing comprises at least one of the following:
posting a notification on a website notifying that the spam filter and spam list are available for downloading;
automatically pushing the spam filter and spam list out to mail servers, email servers and client email software; and
manually pushing the spam filter and spam list out to mail servers, email servers, and client email software.

80. A computer-readable storage medium having stored thereon computer components, when executed by one or more processor for facilitating classification of messages in connection with spam prevention, the components comprising:
a component that receives a set of messages;
a component that identifies intended recipients of the messages, and tags a subset of the messages to be polled, the subset of messages corresponding to a subset of recipients that are known spam fighting users, wherein the subset of messages to be polled is determined before the messages are labeled as spam or not spam, as such all messages are considered for polling including those messages which are designated as spam by a currently employed spam filter;
a message modification component that modifies the tagged messages to identify them as polling messages to users;
a feedback component that receives information relating to the user's classification of the polled messages, and employs the information in connection with training a spam filter and populating a spam list, wherein the feedback component employs machine learning techniques to train the spam filter; and
a component that modifies a message tagged for polling to identify it as a polling message, wherein the modified message comprises voting instructions and any one of at least two voting buttons and links which correspond to at least two respective classes of messages facilitate classification of the message by the user, wherein the voting buttons correspond to respective links such that when any one of the voting buttons is selected by the user, information relating to the selected voting button, the respective user, and the message's unigue ID assigned thereto is sent to a database for storage.

81. A system that facilitates classifying messages in connection with spam preVention comprising a computer-readable storage medium, comprising:
computer-executable means for receiving a set of the messages;
computer-executable means for identifying intended recipients of the messages;
computer-executable means for tagging a subset of the messages to be polled, the subset of messages corresponding to a subset of the recipients that are known spam fighting users wherein the subset of messages to be polled is determined before the messages are labeled as spam or not spam, as such all messages are considered for polling including those messages which are designated as spam by a currently employed spam filter;

computer-executable means for receiving information relating to the user's classification of the polling messages;

computer-executable means for employing the information in connection with training a spam filter and populating a spam list, wherein training the spam filter is employed via a machine learning technique; and computer-executable means for modifying a message tagged for polling to identify it as a polling message, wherein the modified message comprises voting instructions and any one of at least two voting buttons and links which correspond to at least two respective classes of messages facilitate classification of the message by the user, wherein the voting buttons correspond to respective links such that when any one of the voting buttons is selected by the user, information relating to the selected voting button, the respective user, and the message's unigue ID assigned thereto is sent to a database for storage.

* * * * *